US010447990B2

(12) United States Patent
Chen et al.

(10) Patent No.: US 10,447,990 B2
(45) Date of Patent: Oct. 15, 2019

(54) NETWORK ABSTRACTION LAYER (NAL) UNIT HEADER DESIGN FOR THREE-DIMENSIONAL VIDEO CODING

(71) Applicant: QUALCOMM Incorporated, San Diego, CA (US)

(72) Inventors: Ying Chen, San Diego, CA (US); Ye-Kui Wang, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 958 days.

(21) Appl. No.: 13/779,468

(22) Filed: Feb. 27, 2013

(65) Prior Publication Data

US 2013/0222538 A1 Aug. 29, 2013

Related U.S. Application Data

(60) Provisional application No. 61/604,436, filed on Feb. 28, 2012.

(51) Int. Cl.
*H04N 13/161* (2018.01)
*H04N 19/597* (2014.01)
(Continued)

(52) U.S. Cl.
CPC ........... *H04N 13/161* (2018.05); *H04N 19/12* (2014.11); *H04N 19/188* (2014.11); *H04N 19/597* (2014.11); *H04N 19/70* (2014.11)

(58) Field of Classification Search
CPC .................................................. H04N 13/161
(Continued)

(56) References Cited

U.S. PATENT DOCUMENTS

2007/0177671 A1  8/2007  Yang
2008/0317124 A1  12/2008  Cho et al.
(Continued)

FOREIGN PATENT DOCUMENTS

CN       101375594 A    2/2009
CN       101981936 A    2/2011
(Continued)

OTHER PUBLICATIONS

Bross et al., "High efficiency video coding (HEVC) text specification draft 8," 10th Meeting: Stockholm, SE, Jul. 11-20, 2012, JCTVC-J1003_d7, 261 pp.
(Continued)

*Primary Examiner* — Mikhail Itskovich
(74) *Attorney, Agent, or Firm* — Shumaker & Sieffert, P.A.

(57) ABSTRACT

A video encoder generates a network abstraction layer (NAL) unit that includes at least a first syntax element and a second syntax element. The first syntax element indicates that the NAL unit belongs to a particular NAL unit type. Coded slices of texture view components and depth view components are encapsulated within NAL units that belong to the particular NAL unit type. The second syntax element indicates whether a NAL unit header of the NAL unit includes an Advanced Video Coding (AVC)-compatible 3-dimensional video (3DV) header extension or includes a Multiview Video Coding (MVC)-compatible 3DV header extension. The video encoder outputs a bitstream that includes the NAL unit. A video decoder receives the NAL unit and determines whether the second syntax element indicates that the NAL unit header of the NAL unit includes the AVC-compatible 3DV header extension or the MVC-compatible 3DV header extension.

38 Claims, 8 Drawing Sheets

(51) Int. Cl.
*H04N 19/70* (2014.01)
*H04N 19/12* (2014.01)
*H04N 19/169* (2014.01)

(58) Field of Classification Search
USPC .......................................................... 348/43
See application file for complete search history.

(56) References Cited

U.S. PATENT DOCUMENTS

| | | | |
|---|---|---|---|
| 2009/0268816 | A1 | 10/2009 | Pandit et al. |
| 2010/0309286 | A1 | 12/2010 | Chen et al. |
| 2011/0019746 | A1 | 1/2011 | Lim et al. |
| 2011/0064146 | A1 | 3/2011 | Chen et al. |
| 2011/0081131 | A1 | 4/2011 | Hattori |
| 2011/0149032 | A1 | 6/2011 | Choi et al. |
| 2011/0157229 | A1 | 6/2011 | Ni et al. |
| 2011/0216833 | A1 | 9/2011 | Chen et al. |
| 2011/0249757 | A1 | 10/2011 | Newton et al. |
| 2011/0298895 | A1 | 12/2011 | Tian et al. |
| 2012/0044322 | A1* | 2/2012 | Tian et al. ................. 348/43 |
| 2012/0118744 | A1 | 5/2012 | Liang et al. |
| 2012/0229602 | A1 | 9/2012 | Chen et al. |
| 2012/0229603 | A1 | 9/2012 | Bruls et al. |
| 2012/0230433 | A1 | 9/2012 | Chen et al. |
| 2012/0236934 | A1 | 9/2012 | Chen et al. |
| 2013/0142247 | A1 | 6/2013 | Hattori et al. |

FOREIGN PATENT DOCUMENTS

| | | |
|---|---|---|
| CN | 102047673 A | 5/2011 |
| CN | 102138333 A | 7/2011 |
| CN | 102326390 A | 1/2012 |
| JP | 2010157821 A | 7/2010 |
| TW | 201043000 A | 12/2010 |
| TW | 201141236 A | 11/2011 |
| TW | 201143363 A | 12/2011 |
| TW | 201231406 A | 8/2012 |
| WO | 2010126608 A2 | 11/2010 |
| WO | 2010141927 A1 | 12/2010 |

OTHER PUBLICATIONS

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Chen Y., et al.,"Unified NAL unit header design for HEVC and its extensions", Document: JCTVC-G336, 7th Meeting, Geneva, CH, Nov. 21-30, 2011, 8 pp.

International Search Report and Written Opinion—PCT/US2013/028319—ISA/EPO—dated Jun. 4, 2013 11 pp.

ITU-T H.264, Series H: Audiovisual and Multimedia Systems, Infrastructure of audiovisual services—Coding of moving video, Advanced video coding for generic audiovisual services, Mar. 2010, 674 pp.

ITU-T H.264, Series H: Audiovisual and Multimedia Systems, Infrastructure of audiovisual services—Coding of moving video, Advanced video coding for generic audiovisual services, Jun. 2011, 674 pp.

Suzuki, et al., "WD of MVC extension for inclusion of depth maps", ISO/IEC/JTC1/SC29/WG11/N12351, Dec. 2011, 14 pp.

Lim C et al., "Design consideration for compatibility with AVC NAL units", Document: JCT-VC-E375, Geneva, 5th Meeting, Mar. 16-23, 2011, 2 pp.

Wenger, "Options for High-Level Syntax for Multistandard Scalability", Document: JCTVC-G149, 7th Meeting, Geneva, CH, Nov. 21-30, 2011, 6 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Hannukseal, "3D-AVC Draft Text 4," Document: JCT3V-B1002, 2nd Meeting, Shanghai, CN, Oct. 13-19, 2011.

Sullivan, "Editors' draft revision to ITU-T Rec. H.264 ISO/IEC 14496-10Advanced Video Coding—in preperation for ITU-T SG 16 AAP Consent," Document: JVT-AA007, 30th Meeting, Geneva, CH, Jan. 29-Feb. 3, 2009.

Reply to Written Opinion dated Jun. 4, 2013, from international application No. PCT/US2013/028319, dated Sep. 20, 2013, 31 pp.

Hannuksela, et al., "Specification text for 3DV-ATM", MPEG Meeting; Feb. 6-10, 2012; San Jose CA; (Motion Picture Expert Group or ISO/IEC JTC1/SC29/WG11), No. m22915, XP030051440, 17 pp.

Hattori, et al., "Descriptions of 3D Video Coding Proposal (AVC-Compatible Category) by Sony", MPEG Meeting; Nov. 28-Dec. 2, 2011; Geneva; (Motion Picture Expert Group or ISO/IEC JTC1/SC29/WG11), No. m22564, XP030051127, 20 pp.

International Preliminary Report on Patentability from International Application No. PCT/US2013/028319, dated Jun. 4, 2014, 11 pp.

ITU-T H.265, Series H: Audiovisual and Multimedia Systems, Infrastructure of Audiovisual services—Coding of moving video, advanced video coding for generic audiovisual services, The International Telecommunication Union. Oct. 2014, 540 pp.

Second Written Opinion for International Application No. PCT/US2013/028319, dated Feb. 7, 2014, 7 pp.

Response to Second Written Opinion dated Feb. 7, 2014, from International Application No. PCT/US2013/028319, filed on Apr. 7, 2014, 30 pp.

Chen Y., "BoG Report on 3DV High Level Syntax", 99. MPEG Meeting; Jun. 2, 2012 - Oct. 2, 2012; San Jose; (Motion Picture Expert Group or ISO/IEC JTC1/SC29NVG11), No. m23985, Feb. 9, 2012 (Feb. 9, 2012), XP030052510, pp. 1-8.

Hannuksela M.M., et al., "3D-AVC Draft Text 4," Joint Collaborative Team on 3D Video Coding Extension Development of ITU-T SG 16 WP 3 and ISO/IEC JTC 1/SC 29/WG 11, 2nd meeting: Shanghai, CN, Oct. 13-19, 2012, Document JCT#V-B1002, 75 pages.

Rusanovskyy, et al., "Suggestion for a depth-enhanced multiview video coding extension to H.264 Annex A: Nokia 3DV Test Model (3DV-TM) Codec Description and Simulation Results", ITU Telecommunications Standardization -Sector Study Group 16 Question 6 Video Coding Experts Group (VCEG), 44th VCEG Meeting: San Jose, CA,USA, Feb. 3-10, 2012, Document VCEG-AR14, 14 pages.

Schwarz H., et al., "Errata report update for ITU-T Rec. H.264 | ISO/IEC 14496-10", 31. JVT Meeting; 89. MPEG Meeting; Jun. 28, 2009-Mar. 7, 2009; London, (Joint Video Team of ISO/IEC JTC1/SC29/WG11 and ITU-T SG.16), No. JVT-AE011, Jul. 5, 2009 (Jul. 5, 2009), XP030007473, pp. 1-24, ISSN: 0000-0078.

Vetro A., et al., "Joint Draft 8.0 on Multiview Video Coding," Joint Video Team (JVT) of ISO/IEC MPEG & ITU-T VCEG (ISO/IEC JTC1/SC29NVG11 and ITU-T SG16 Q.6), 28th Meeting: Han-

(56) References Cited

OTHER PUBLICATIONS nover, DE, Jul. 20-25, 2008, URL:http://wftp3.itu.int/av-arch/jvt-site/2008_07_Hannover/JVT-AB204.zip, JVT-AB204, Nov. 27, 2008, pp. 1-73.

Bross, B., et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Oct. 10-19, 2012, Document: JCTVC-K1003_v8, 292 Pages.

\* cited by examiner

NETWORK ABSTRACTION LAYER (NAL) UNIT HEADER DESIGN FOR THREE-DIMENSIONAL VIDEO CODING

This application claims the benefit of U.S. Provisional Patent Application No. 61/604,436, filed Feb. 28, 2012, the entire content of which is incorporated herein by reference.

TECHNICAL FIELD

This disclosure relates to video coding (i.e., encoding and/or decoding of video data).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

SUMMARY

A network abstraction layer (NAL) unit may include an Advanced Video Coding (AVC)-compatible 3-dimensional video (3DV) header extension or may include a Multiview Video Coding (MVC)-compatible 3DV header extension. A syntax element in the NAL unit header indicates whether a NAL unit header of the NAL unit includes the AVC-compatible 3DV header extension or includes the MVC-compatible 3DV header extension. A video decoder receives the NAL unit and determines, based at least in part on the syntax element, whether the NAL unit header of the NAL unit includes the AVC-compatible 3DV header extension or the MVC-compatible 3DV header extension. The video decoder may reconstruct video data of the NAL unit based in part on the AVC-compatible 3DV header extension or the MVC-compatible 3DV syntax element.

In one aspect, this disclosure describes a method for encoding video data comprises generating a NAL unit that includes at least a first syntax element and a second syntax element. The first syntax element indicates that the NAL unit belongs to a particular NAL unit type. Coded slices of texture view components and depth view components are encapsulated within NAL units that belong to the particular NAL unit type. The second syntax element indicates whether a NAL unit header of the NAL unit includes an AVC-compatible 3DV header extension or a MVC-compatible 3DV header extension. The AVC-compatible 3DV header extension includes syntax elements associated with AVC-compatible 3DV. The MVC-compatible 3DV header extension has a different syntax structure than the AVC-compatible 3DV header extension and includes syntax elements associated with MVC-compatible 3DV.

In another aspect, this disclosure describes a method for decoding video data comprises receiving a NAL unit that includes at least a first syntax element and a second syntax element. The first syntax element indicates that the NAL unit belongs to a particular NAL unit type. Coded slices of texture view components and depth view components are encapsulated within NAL units that belong to the particular NAL unit type. The method also comprises determining, based at least in part on the second syntax element, whether a NAL unit header of the NAL unit includes an AVC-compatible 3DV header extension or a MVC-compatible 3DV header extension. The AVC-compatible 3DV header extension including syntax elements associated with AVC-compatible 3DV. The MVC-compatible 3DV header extension has a different syntax structure than the AVC-compatible 3DV header extension and includes syntax elements associated with MVC-compatible 3DV.

In another aspect, this disclosure describes a video encoding device that encodes video data. The video encoding device comprises one or more processors configured to generate a NAL unit that includes at least a first syntax element and a second syntax element. The first syntax element indicates that the NAL unit belongs to a particular NAL unit type. Coded slices of texture view components and depth view components are encapsulated within NAL units that belong to the particular NAL unit type. The second syntax element indicates whether a NAL unit header of the NAL unit includes an AVC-compatible 3DV header extension or a MVC-compatible 3DV header extension. The AVC-compatible 3DV header extension includes syntax elements associated with AVC-compatible 3DV. The MVC-compatible 3DV header extension has a different syntax structure than the AVC-compatible 3DV header extension and includes syntax elements associated with MVC-compatible 3DV.

In another aspect, this disclosure describes a video decoding device that decodes video data. The video decoding device comprises one or more processors configured to receive a NAL unit that includes at least a first syntax element and a second syntax element. The first syntax element indicates that the NAL unit belongs to a particular NAL unit type. Coded slices of texture view components and depth view components are encapsulated within NAL units that belong to the particular NAL unit type. The one or more processors are also configured to determine, based at least in part on the second syntax element, whether a NAL unit header of the NAL unit includes an AVC-compatible 3DV header extension or a MVC-compatible header extension. The AVC-compatible 3DV header extension includes syntax elements associated with AVC-compatible 3DV. The MVC-compatible 3DV header extension has a different syntax structure than the AVC-compatible 3DV header extension and includes syntax elements associated with MVC-compatible 3DV.

In another aspect, this disclosure describes a video encoding device that encodes video data. The video encoding device comprises means for generating a NAL unit that includes at least a first syntax element and a second syntax element. The first syntax element indicates that the NAL unit belongs to a particular NAL unit type. Coded slices of texture view components and depth view components are encapsulated within NAL units that belong to the particular NAL unit type. The second syntax element indicates whether a NAL unit header of the NAL unit includes an AVC-compatible 3DV header extension or a MVC-compatible header extension. The AVC-compatible 3DV header extension includes syntax elements associated with AVC-compatible 3DV. The MVC-compatible 3DV header extension has a different syntax structure than the AVC-compatible 3DV header extension and includes syntax elements associated with MVC-compatible 3DV.

In another aspect, this disclosure describes a video decoding device that decodes video data. The video decoding device comprises means for receiving a NAL unit that includes at least a first syntax element and a second syntax element. The first syntax element indicates that the NAL unit belongs to a particular NAL unit type. Coded slices of texture view components and depth view components are encapsulated within NAL units that belong to the particular NAL unit type. The video decoding device also comprises means for determining, based at least in part on the second syntax element, whether a NAL unit header of the NAL unit includes an AVC-compatible 3DV header extension or a MVC-compatible header extension. The AVC-compatible 3DV header extension includes syntax elements associated with AVC-compatible 3DV. The MVC-compatible 3DV header extension has a different syntax structure than the AVC-compatible 3DV header extension and includes syntax elements associated with MVC-compatible 3DV.

In another aspect, this disclosure describes a computer-readable storage medium that stores instructions that, when executed by one or more processors of a video encoding device, configure the video encoding device to generate a NAL unit that includes at least a first syntax element and a second syntax element. The first syntax element indicates that the NAL unit belongs to a particular NAL unit type. Coded slices of texture view components and depth view components are encapsulated within NAL units that belong to the particular NAL unit type. The one or more processors are also configured to determine, based at least in part on the second syntax element, whether a NAL unit header of the NAL unit includes an AVC-compatible 3DV header extension or a MVC-compatible header extension. The AVC-compatible 3DV header extension includes syntax elements associated with AVC-compatible 3DV. The MVC-compatible 3DV header extension has a different syntax structure than the AVC-compatible 3DV header extension and includes syntax elements associated with MVC-compatible 3DV.

In another aspect, this disclosure describes a computer-readable storage medium that stores instructions that, when executed by one or more processors of a video decoding device, configure the video decoding device to receive a NAL unit that includes at least a first syntax element and a second syntax element. The first syntax element indicates that the NAL unit belongs to a particular NAL unit type. Coded slices of texture view components and depth view components are encapsulated within NAL units that belong to the particular NAL unit type. The video decoding device also comprises means for determining, based at least in part on the second syntax element, whether a NAL unit header of the NAL unit includes an AVC-compatible 3DV header extension or a MVC-compatible header extension. The AVC-compatible 3DV header extension includes syntax elements associated with AVC-compatible 3DV. The MVC-compatible 3DV header extension has a different syntax structure than the AVC-compatible 3DV header extension and includes syntax elements associated with MVC-compatible 3DV.

The details of one or more examples of the disclosure are set forth in the accompanying drawings and the description below. Other features, objects, and advantages will be apparent from the description, drawings, and claims.

DETAILED DESCRIPTION

Figure 1:
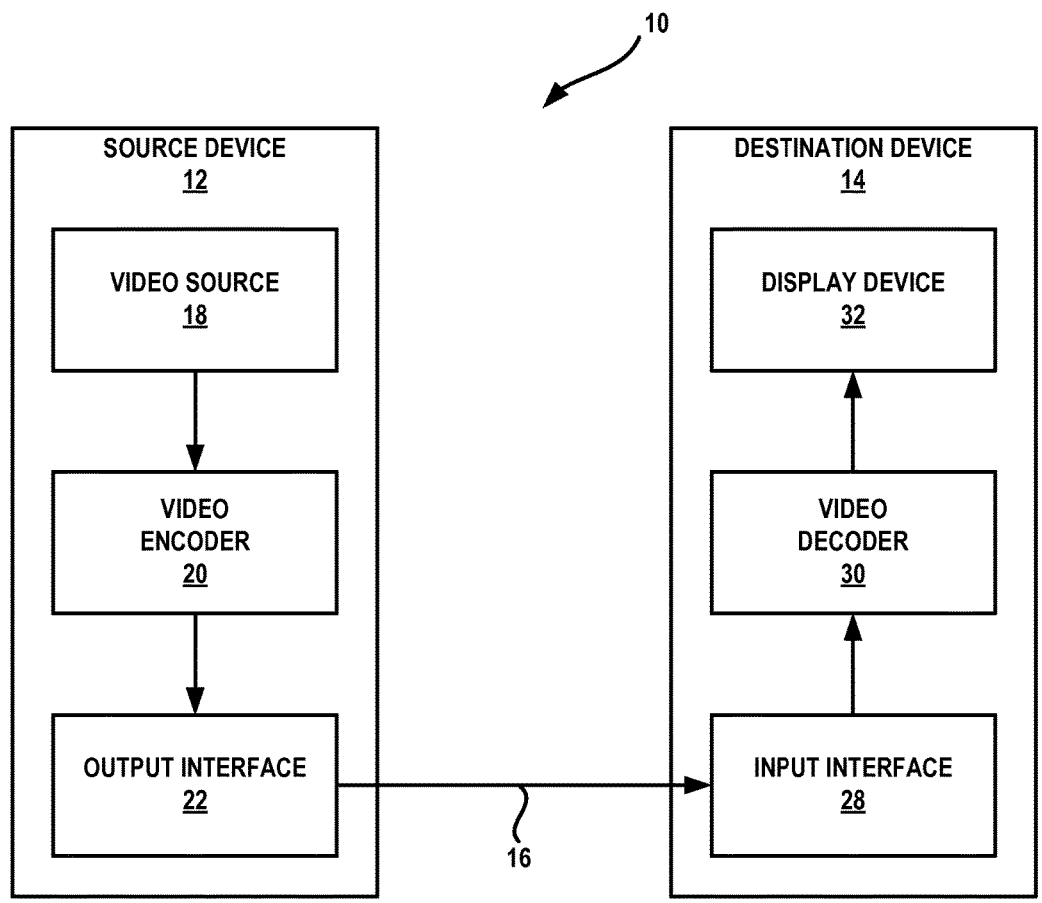
FIG. 1 is a block diagram illustrating an example video coding system that may utilize the techniques described in this disclosure.

A bitstream may include an encoded representation of video data. The encoded representation of the video data may comprise a series of network abstraction layer (NAL) units. Multiview Video Coding (MVC)-compatible 3-dimensional video (3DV) and Advanced Video Coding (AVC)-compatible 3-dimensional video (3DV) are two extensions to the H.264/AVC video coding standard. NAL unit headers of NAL units for the MVC-compatible 3DV and AVC-compatible 3DV extensions may include different sets of syntax elements in addition to those defined in the H.264/AVC standard. The use of new NAL unit types for the MVC-compatible 3DV and AVC-compatible 3DV extensions has been proposed as a way to accommodate these additional syntax elements. However, the number of available NAL unit types of the H.264/AVC standard is limited and it may be desirable to conserve the remaining available NAL unit types for future extensions of the H.264/AVC standard.

The techniques of this disclosure address this issue. In accordance with the techniques of this disclosure, a video encoder may generate a NAL unit that includes at least a first syntax element and a second syntax element. The first syntax element indicates that the NAL unit belongs to a particular NAL unit type. Coded slices of texture view components and depth view components are encapsulated within NAL units that belong to the particular NAL unit type. The second syntax element indicates whether a NAL unit header of the NAL unit includes an AVC-compatible 3DV header extension or a MVC-compatible header extension. The AVC-compatible 3DV header extension includes syntax elements associated with AVC-compatible 3DV. The MVC-compatible 3DV header extension has a different syntax structure than the AVC-compatible 3DV header extension and includes syntax elements associated with MVC-compatible 3DV. The video encoder outputs a bitstream that includes the NAL unit. A video decoder may receive the NAL unit and determine, based at least in part on the second syntax element, whether the NAL unit header of the NAL unit includes the AVC-compatible 3DV header extension or an MVC-compatible 3DV header extension. The video decoder may reconstruct video data based in part on the AVC-compatible 3DV header extension or the MVC-compatible 3DV header extension. In this way, separate NAL unit types do not need to be used for NAL units whose NAL unit header include AVC-compatible 3DV header extensions and NAL units whose NAL unit headers include MVC-compatible 3DV header extensions.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words may merely be used to refer to different elements of a same or similar type.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) and Multiview Video Coding (MVC) extensions. A recent draft of the MVC extension of H.264/AVC is, as of Jan. 14, 2013, available for download at http://wftp3.itu.int/av-arch/jvt-site/2009_01_Geneva/JVT-AD007.zip, the entire content of which is incorporated herein by reference. In addition, there is a video coding standard, as an extension of the MVC standard, namely "MVC-based 3DV" (i.e., MVC-compatible 3DV), described in "WD of MVC extension for inclusion of depth maps," MPEG document w12351, the entire content of which is incorporated herein by reference. A draft of the AVC-compatible 3DV extension of H264/AVC is described in Mannuksela et al., "3D-AVC Draft Text 4," Joint Collaborative Team on 3D Video Coding Extension Development of ITU-T SG 16 WP 3 and ISO/IEC JTC 1/SC 29/WG 11, 2$^{nd}$ meeting, Shanghai China, October 2012, which, as of Jan. 14, 2013, is available at http://phenix.it-sudparis.eu/jct2/doc_end_user/documents/2_Shanghai/wg11/JCT3V-B1002-v1.zip, the entire content of which is incorporated herein by reference. Any legal bitstream conforming to AVC-compatible 3DV may always contain a sub-bitstream that is compliant to a MVC profile, e.g., stereo high profile.

In other examples, video encoder 20 and video decoder 30 may operate according to other video compression standards, including ITU-T H.261, ISO/IEC MPEG-1 Visual, ITU-T H.262, ISO/IEC MPEG-2 Visual, ITU-T H.263, ISO/IEC MPEG-4 Visual, and the High Efficiency Video Coding (HEVC) standard presently under development. A draft of the upcoming HEVC standard, referred to as "HEVC Working Draft 9," is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, China, October, 2012, which, as of Jan. 14, 2013, is downloadable from: http://phenix.int-evry.fr/jct/doc_end_user/documents/11_Shanghai/wg11/JCTVC-K1003-v8.zip, the entire content of which is incorporated herein by reference. Although the techniques of this disclosure are described with respect to H.264/AVC, such techniques may be applied to other coding standards and are not limited to any particular coding standard or technique.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describe an encoding mode for the respective frame. Video encoder 20 typically operates on video blocks within individual video frames in order to encode the video data. In H.264/AVC, a video block may correspond to a macroblock or a partition of a macroblock. In HEVC, a video block may correspond to a coding unit (CU). Video blocks may have fixed or varying sizes, and may differ in size according to a specified coding standard. Furthermore, each video frame may include a plurality of slices. Each slice may include a plurality of video blocks.

When video encoder 20 encodes a video block, video encoder 20 may generate a predictive pixel block that corresponds to the video block. Video encoder 20 may perform intra prediction or inter prediction to generate the predictive pixel block. When video encoder 20 performs intra prediction on a video block, video encoder 20 may generate, based on samples (e.g., values of pixel components) within the same video frame as the video block, a predictive pixel block that corresponds to the video block. When video encoder 20 performs inter prediction to generate a predictive pixel block that corresponds to a video block, video encoder 20 may generate the predictive pixel block based on samples within one or more reference pictures. The reference pictures may be pictures other than the picture that contains the video block.

After video encoder 20 generates a predictive pixel block that corresponds to a video block, video encoder 20 may generate a residual video block that corresponds to the video block. Each sample in the residual video block may be based on a difference between corresponding samples in the video block and the predictive pixel block. Video encoder 20 may apply a transform to the residual video block to generate one or more coefficient blocks. Video encoder 20 may apply various transforms to the residual video block. For example, video encoder 20 may apply a transform such as a discrete cosine transform (DCT), an integer transform, a wavelet transform, or a conceptually-similar transform to the residual video block. Video encoder 20 may quantize the coefficient blocks to further reduce the number of bits used to represent the video block. After quantizing a coefficient block, video encoder 20 may entropy encode syntax elements that represent coefficients in the coefficient block and other syntax elements associated with the video block. For example, video encoder 20 may perform context-adaptive binary arithmetic coding (CABAC), context-adaptive variable length coding (CAVLC), exponential-Golomb coding, or another type of entropy encoding on the syntax elements. Video encoder 20 may output a bitstream that includes the entropy-encoded syntax elements associated with the video block.

Video decoder 30 may receive a bitstream that includes an encoded representation of video data. Video decoder 30 may parse the bitstream to extract syntax elements from the bitstream. As part of extracting the syntax elements from the bitstream, video decoder 30 may entropy decode portions of the bitstream. Video decoder 30 may perform, based at least in part on the syntax elements associated with the video block, inter or intra prediction to generate a predictive pixel block for the video block. In addition, video decoder 30 may inverse quantize coefficients of coefficient blocks associated with the video block and may apply one or more inverse transforms to the coefficient blocks to generate a residual video block for the video block. Video decoder 30 may then reconstruct the video block based at least in part on the residual video block and the predictive pixel block. In this way, by reconstructing each of the video blocks of a frame, video decoder 30 may reconstruct the frame.

As mentioned above, video encoder 20 may perform inter prediction to generate a predictive pixel block that corresponds to a particular video block. More specifically, video encoder 20 may perform uni-directional inter prediction or bi-directional inter prediction to generate the predictive pixel block.

When video encoder 20 performs uni-directional inter prediction for a particular video block, video encoder 20 may search for a reference block within reference pictures in a single reference picture list. The reference block may be a block of samples that is similar to the particular video block. Furthermore, when video encoder 20 performs uni-directional inter prediction, video encoder 20 may generate motion information for the particular video block. The motion information for the particular video block may include a motion vector and a reference picture index. The motion vector may indicate a spatial displacement between a position of the particular video block within the current frame (i.e., the frame that includes the particular video block) and a position of the reference block within the reference frame. The reference picture index indicates a position within the reference picture list of the reference frame that contains the reference picture list. The predictive pixel block for the particular video block may be equal to the reference block.

When video encoder 20 performs bi-directional inter prediction for a particular video block, video encoder 20 may search for a first reference block within reference pictures in a first reference picture list ("list 0") and may search for a second reference block within reference pictures in a second reference picture list ("list 1"). Video encoder 20 may generate, based at least in part on the first and the second reference blocks, the predictive pixel block for the particular video block. In addition, video encoder 20 may generate a first motion vector that indicates a spatial displacement between the particular video block and the first reference block. Video encoder 20 may also generate a first reference picture index that identifies a location within the first reference picture list of the reference picture that contains the first reference block. Furthermore, video encoder 20 may generate a second motion vector that indicates a spatial displacement between the particular video block and the second reference block. Video encoder 20 may also generate a second reference picture index that identifies a location within the second reference picture list of the reference picture that includes the second reference block.

When video encoder 20 performs uni-directional inter prediction on a particular video block, video decoder 30 may use the motion information of the particular video block to identify the reference sample of the particular video block. Video decoder 30 may then generate the predictive pixel block of the particular video block based on the reference sample of the particular video block. When video encoder 20 performs bi-directional inter prediction on a particular video block, video decoder 30 may use the motion information of the particular video block to identify the two reference samples of the particular video block. Video decoder 30 may generate the predictive pixel block of the particular video block based on the two reference samples of the particular video block.

Multiview Video Coding (MVC)-compatible 3DV is an extension of the H.264/AVC standard. MVC-compatible 3DV may also be referred to as MVC-based 3DV. In the MVC-compatible 3DV extension to H.264/AVC, there may be multiple views of the same scene from different viewpoints. The term "access unit" is used to refer to the set of pictures that correspond to the same time instance. Thus, video data may be conceptualized as a series of access units occurring over time.

MVC-compatible 3DV supports inter-view prediction. Inter-view prediction is similar to the inter prediction used in H.264/AVC and may use the same syntax elements. However, when a video coder performs inter-view prediction on a video block, video encoder 20 may use, as a reference picture, a picture that is in the same access unit as the video block, but in a different view. In contrast, conventional inter prediction only uses pictures in different access units as reference pictures. In MVC-compatible 3DV, a view is referred to as a "base view" if a video decoder (e.g., video decoder 30) can decode pictures in the view without reference to pictures in any other view. When coding a picture in one of the non-base views, a video coder may add a picture into a reference picture list if the picture is in a different view but within a same time instance as the picture that the video coder is currently coding. Like other inter prediction reference pictures, the video coder may insert an inter-view prediction reference picture at any position of a reference picture list. In MVC-compatible 3DV, inter-view prediction may be supported by disparity motion compensation. Disparity motion compensation uses the syntax of the H.264/AVC motion compensation, but may allow a picture in a different view to be used as a reference picture. Coding of two or more views may be supported by MVC-compatible 3DV. One of the advantages of MVC-compatible 3DV may be that an MVC-compatible 3DV encoder may use more than two views as a 3D video input and an MVC decoder may decode such a multiview representation. As a result, video decoders that support MVC-compatible 3DV may process 3D video content with more than two views.

MVC-compatible 3DV provides for depth maps. Depth maps are pictures whose pixel values represent the three-dimensional depths of objects shown in corresponding "texture" pictures. In some examples, brighter pixel values in a depth map may correspond to objects that are closer to a camera and darker pixel values in a depth map may correspond to objects that are further from the camera. The "texture" pictures may be normal H.264/AVC pictures. The texture part of a view in one access unit, i.e., a texture view in an access unit, is named a "texture view component." A depth map for an access unit may also be referred to as a "depth view component" of the access unit. The term "view component" may be used to refer to a view in an access unit and collectively refers to both the texture view component and the depth view component in the same access unit. In some instance, in MVC-compatible 3DV, no depth view component is allowed to be encoded based on a texture view component.

Furthermore, there is an ongoing effort to generate a three-dimensional video (3DV) coding extension to H.264/AVC, namely AVC-compatible 3DV. Like MVC-compatible 3DV, AVC-compatible 3DV provides for depth maps. In the AVC 3DV extension, video encoder 20 may encode a depth map in the same manner as other views of an access unit. That is, in addition to texture pictures for different views, an access unit may include a depth map. AVC-compatible 3DV allows a depth view component to be encoded based on a texture view component. This may increase coding efficiency, but may increase complexity.

In both MVC-compatible 3DV and AVC-compatible 3DV, video encoder 20 may use Depth Image Based Rendering (DIBR) to generate, based on available texture and depth view components, a synthetic texture view component. A synthetic texture view component may be a texture view component that is synthesized based on a depth map and one or more texture view components. For example, a particular texture view component may be a left-eye texture view component and video encoder 20 may use DIBR to generate a right-eye texture view component for 3-dimensional video playback. In some instances, a synthetic texture view component may be used as a reference picture for inter-access unit prediction or inter-view prediction. Synthetic texture view components that are used as reference pictures may be referred to as view synthesis reference pictures (VSRPs). Video coders may include VSRPs in reference picture lists.

As mentioned briefly above, video encoder 20 may output a bitstream that contains encoded video data. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP may include zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for supplemental enhancement information (SEI), and so on.

NAL units that encapsulate RBSPs for video coding data (as opposed to RBSPs for parameter sets and SEI messages) may be referred to as video coding layer (VCL) NAL units. A NAL unit that encapsulates a coded slice may be referred to as a coded slice NAL unit. In some designs of AVC-compatible 3DV, VCL NAL units that encapsulate coded depth view components have NAL unit type 21.

The NAL units that encapsulate coded view components that conform to AVC-compatible 3DV have different syntax elements in their NAL unit headers than NAL units that encapsulate coded view components that conform to MVC-compatible 3DV. For example, the NAL units that encapsulate coded view components that conform to AVC-compatible 3DV may include the following syntax elements: non_idr_flag, anchor_pic_flag, temporal_id, inter_view_flag, depth_flag, and view_idx_flag. NAL units for MVC-compatible 3DV also include the non_idr_flag, anchor_pic_flag, temporal_id, and inter_view_flag syntax elements. The non_idr_flag, anchor_pic_flag, temporal_id, and inter_view_ flag syntax elements may have the same semantics in NAL units for AVC-compatible 3DV and MVC-compatible 3DV. However, NAL units for MVC-compatible 3DV do not include the view_idx and depth_flag syntax elements.

The view_idx syntax element specifies a view order index for the NAL unit. NAL units with the same value of view_idx belong to the same view. The view_idx syntax element may be the same as the view_order_index syntax element in MVC-compatible 3DV. If the depth_flag syntax element is equal to 1, the NAL unit belongs to a depth view component. If the depth_flag syntax element is equal to 0, the NAL unit belongs to a texture view component. When the depth_flag syntax element is not present, video decoder 30 may infer (i.e., automatically determine) that the depth_flag syntax element is equal to 0.

There are several problems with the design of AVC-compatible 3DV described above. First, in order for AVC-compatible 3DV to co-exist with other extensions to AVC, a new NAL unit type may be required for VCL NAL units of non-base, texture view components and/or depth view components. Second, the current design of AVC-compatible 3DV extension may require the use of a new prefix NAL unit if the VCL NAL units of non-base texture view components have different syntax elements than the prefix NAL unit used in MVC-compatible 3DV. A prefix NAL unit may be a NAL unit that includes a NAL unit header (and a NAL unit header extension) and encapsulates a 0-byte RBSP. Thus, the design of AVC-compatible 3DV described above may require the use of three new NAL unit types: a new prefix NAL unit type, a new NAL unit type for VCL NAL units of non-base texture view components, and a new NAL unit type for VCL NAL units of depth view components. The use of new NAL unit types may be problematic because there are only a few remaining unused NAL unit types in the H.264/AVC standard.

The techniques of this disclosure may address the problems described above. In accordance with the techniques of this disclosure, video encoder 20 may generate a NAL unit that includes at least a first and a second syntax element. The first syntax element ("nal_unit_type") indicates that the NAL unit belongs to a particular NAL unit type. Coded slices of texture view components and coded slices of depth view components may be encapsulated within NAL units that belong to the particular NAL unit type. The second syntax element ("avc_based_3dv_flag") indicates whether a NAL unit header of the NAL unit includes an AVC-compatible 3DV header extension or a MVC-compatible 3DV header extension. The "avc_based_3dv_flag" may immediately precede the AVC 3DV header extension or the MVC header extension. The AVC-compatible 3DV header extension includes syntax elements associated with AVC-compatible 3DV. The MVC-compatible 3DV header extension has a different syntax structure than the AVC-compatible 3DV header extension and includes syntax elements associated with MVC-compatible 3DV.

Because NAL units may include the "avc_based_3dv_flag," NAL units that include AVC-compatible 3DV header extensions and MVC-compatible 3DV header extensions may belong to the same NAL unit type. Accordingly, the "avc_based_3dv_flag" may eliminate the need for separate NAL unit types for NAL units that include AVC-compatible 3DV header extensions and MVC-compatible 3DV header extensions. In this way, the techniques of this disclosure may conserve the available NAL unit types for future extensions of H.264/AVC. In some examples, a NAL unit may include the "avc_based_3dv_flag" only if the "nal_unit_type" is equal to 21.

Figure 2:
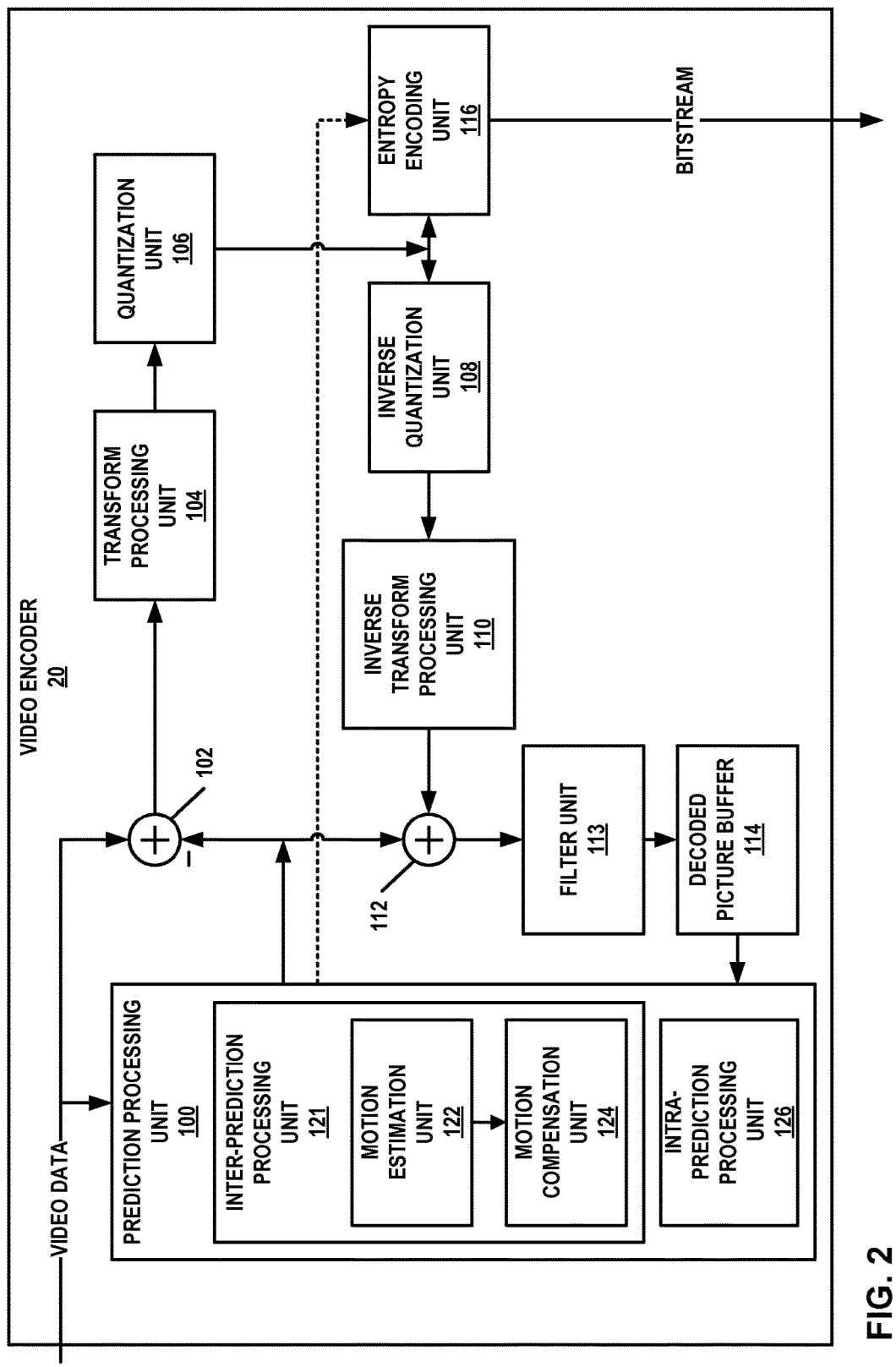
FIG. 2 is a block diagram illustrating an example video encoder that may implement the techniques described in this disclosure.

FIG. 2 is a block diagram that illustrates an example video encoder 20 that is configured to implement the techniques of this disclosure. FIG. 2 is provided for purposes of explanation and should not be considered limiting of the techniques as broadly exemplified and described in this disclosure. For purposes of explanation, this disclosure describes video encoder 20 in the context of H.264/AVC coding. However, the techniques of this disclosure may be applicable to other coding standards or methods.

In the example of FIG. 2, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 113, a decoded picture buffer 114, and an entropy encoding unit 116. Prediction processing unit 100 includes an inter-prediction processing unit 121 and an intra-prediction processing unit 126. Inter-prediction processing unit 121 includes a motion estimation unit 122 and a motion compensation unit 124. In other examples, video encoder 20 may include more, fewer, or different functional components.

Video encoder 20 receives video data. To encode the video data, video encoder 20 may encode each slice of each picture of the video data. As part of encoding a slice, video encoder 20 may encode video blocks in the slice.

Inter-prediction processing unit 121 may generate predictive data for a video block by performing inter prediction on the video block. The predictive data for the video block may include a predictive pixel block that corresponds to the video block and motion information for the video block.

Slices may be I slices, P slices, or B slices. Motion estimation unit 122 and motion compensation unit 124 may perform different operations for a video block depending on whether the video block is in an I slice, a P slice, or a B slice. In an I slice, all video blocks are intra predicted. Hence, if the video block is in an I slice, motion estimation unit 122 and motion compensation unit 124 do not perform inter prediction on the video block.

If the video block is in a P slice, motion estimation unit 122 may search the reference pictures in a reference picture list (e.g., list 0) for a reference block for the video block. In examples where video encoder 20 uses MVC-compatible 3DV or AVC-compatible 3DV, the reference picture list may include inter-view reference pictures. In examples where video encoder 20 uses AVC-compatible 3DV, the inter-view reference pictures in the reference picture list may include reference pictures synthesized based on a depth map. The reference block of the video block may be a pixel block that most closely corresponds to the video block. Motion estimation unit 122 may use a variety of metrics to determine how closely a pixel block in a reference picture corresponds to the video block. For example, motion estimation unit 122 may determine how closely a pixel block in a reference picture corresponds to the video block by sum of absolute difference (SAD), sum of square difference (SSD), or other difference metrics.

Motion estimation unit 122 may generate a reference picture index that indicates the reference picture in list 0 containing a reference block of a video block in a P slice and a motion vector that indicates a spatial displacement between the video block and the reference block. Motion estimation unit 122 may output the reference picture index and the motion vector as the motion information of the video block. Motion compensation unit 124 may generate the predictive pixel block for the video block based on the reference block indicated by the motion information of the video block.

If the video block is in a B slice, motion estimation unit 122 may perform uni-directional inter prediction or bi-directional inter prediction for the video block. To perform uni-directional inter prediction for the video block, motion estimation unit 122 may search the reference pictures of list 0 or a second reference picture list (e.g., list 1) for a reference block for the video block. In examples where video encoder 20 uses MVC or 3DV, list 0 and/or list 1 may include inter-view reference pictures. Motion estimation unit 122 may generate a reference picture index that indicates a position in list 0 or list 1 of the reference picture that contains the reference block and a motion vector that indicates a spatial displacement between the video block and the reference block. Motion estimation unit 122 may also generate a prediction direction indicator that indicates whether the reference picture is in list 0 or list 1.

To perform bi-directional inter prediction for a video block, motion estimation unit 122 may search the reference pictures in list 0 for a reference block for the video block and may also search the reference pictures in list 1 for another reference block for the video block. Motion estimation unit 122 may generate reference picture indexes that indicate positions in list 0 and list 1 of the reference pictures that contain the reference blocks. In addition, motion estimation unit 122 may generate motion vectors that indicate spatial displacements between the reference blocks and the video block. The motion information of the video block may include the reference picture indexes and the motion vectors of the video block. Motion compensation unit 124 may generate the predictive sample blocks of the video block based on the reference blocks indicated by the motion information of the video block. A sample block may be a block of samples (e.g., luminance samples or chrominance samples.)

Intra-prediction processing unit 126 may generate predictive data for a video block by performing intra prediction on the video block. The predictive data for the video block may include a predictive pixel block for the video block and various syntax elements. A pixel block may be a block of pixels. Because each pixel may include a plurality of samples, each pixel block may be divided into a plurality of sample blocks, one for each type of sample. Intra-prediction processing unit 126 may perform intra prediction on video block in I slices, P slices, and B slices.

To perform intra prediction on a video block, intra-prediction processing unit 126 may use multiple intra prediction modes to generate multiple sets of predictive data for the video block. To use an intra prediction mode to generate a set of predictive data for the video block, intra-prediction processing unit 126 may extend samples from neighboring video blocks across the video block in a direction associated with the intra prediction mode. The neighboring video blocks may be above, above and to the right, above and to the left, or to the left of the video block, assuming a left-to-right, top-to-bottom encoding order for video blocks. In some examples, the number of intra prediction modes may depend on the size of the video block.

Prediction processing unit 100 may select the predictive data for a video block from among the predictive data generated by inter-prediction processing unit 121 for the video block or the predictive data generated by intra-prediction processing unit 126 for the video block. In some examples, prediction processing unit 100 selects the predictive data for the video block based on rate/distortion metrics of the sets of predictive data.

Residual generation unit 102 may generate residual sample blocks by subtracting samples in a predictive pixel block from corresponding samples of a video block. Transform processing unit 104 may generate coefficient blocks for each residual sample block by applying one or more transforms to the residual sample block. Transform processing unit 104 may apply various transforms to a residual sample block. For example, transform processing unit 104 may apply a discrete cosine transform (DCT), a directional transform, or a conceptually similar transform to a residual sample block.

Quantization unit 106 may quantize the coefficients in a coefficient block. The quantization process may reduce the bit depth associated with some or all of the coefficients. For example, an n-bit coefficient may be rounded down to an m-bit coefficient during quantization, where n is greater than m. Quantization unit 106 may quantize a coefficient block based on a quantization parameter (QP) value. Video encoder 20 may adjust the degree of quantization applied to coefficient blocks by adjusting the QP value.

Inverse quantization unit 108 and inverse transform processing unit 110 may apply inverse quantization and inverse transforms to a coefficient block, respectively, to reconstruct a residual sample block from the coefficient block. Reconstruction unit 112 may add samples in reconstructed residual sample blocks to corresponding samples from one or more predictive sample blocks generated by prediction processing unit 100 to produce reconstructed sample blocks. Filter unit 113 may perform a deblocking operation to reduce blocking artifacts in reconstructed video blocks. Decoded picture buffer 114 may store the reconstructed video block after filter unit 113 performs the one or more deblocking operations on the reconstructed video block. Motion estimation unit 122 and motion compensation unit 124 may use a reference picture that contains the reconstructed video blocks to perform inter prediction on video blocks of subsequent pictures. In addition, intra-prediction processing unit 126 may use reconstructed video blocks in decoded picture buffer 114 to perform intra prediction.

Entropy encoding unit 116 may receive data from other functional components of video encoder 20. For example, entropy encoding unit 116 may receive coefficient blocks from quantization unit 106 and may receive syntax elements from prediction processing unit 100. Entropy encoding unit 116 may perform one or more entropy encoding operations on the data to generate entropy-encoded data. For example, video encoder 20 may perform a CAVLC operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb coding operation, or another type of entropy encoding operation on the data.

Video encoder 20 may output a bitstream that includes the entropy-encoded data generated by entropy encoding unit 116. The bitstream may include a series of NAL units. Each of the NAL units may include a NAL unit header and an RBSP. In accordance with the techniques of this disclosure, the NAL unit header may include a syntax element that indicates whether the slice header includes an AVC-compatible 3DV header extension or includes a MVC-compatible 3DV header extension. In some examples, video encoder 20 may generate a NAL unit that conforms to the syntax described in Table 1, below.

TABLE 1

```
nal_unit( NumBytesInNALunit ) {
  forbidden_zero_bit
  nal_ref_idc
  nal_unit_type
  NumBytesInRBSP = 0
  nalUnitHeaderBytes = 1
  if( nal_unit_type = = 14 || nal_unit_type = = 20 ) {
    svc_extension_flag
    if( svc_extension_flag )
      nal_unit_header_svc_extension( ) /* specified in Annex G */
    Else
      nal_unit_header_mvc_extension( ) /* specified in Annex H */
    nalUnitHeaderBytes += 3
  }
  if ( nal_unit_type = = 21 ) {
    avc_based_3dv_flag
    if ( avc_based_3dv_flag ) {
      nal_unit_header_avc_3dv_extension( ) /* specified in Annex J */
      nalUnitHeaderBytes +=2
    }
    else {
      nal_unit_header_mvc_extension( ) /* specified in Annex H */
      nalUnitHeaderBytes +=3
    }
  }
  for( i = nalUnitHeaderBytes; i < NumBytesInNALunit;
  i++ ) {
    if( i + 2 < NumBytesInNALunit && next_bits( 24 ) = =
    0x000003 ) {
      rbsp_byte[ NumBytesInRBSP++ ]
      rbsp_byte[ NumBytesInRBSP++ ]
      i += 2
      emulation_prevention_three_byte /* equal to 0x03 */
    } else
      rbsp_byte[ NumBytesInRBSP++ ]
  }
}
```

In the example syntax of Table 1, the svc_extension_flag syntax element indicates whether the NAL unit relates to a scalable video coding (SVC) extension to the H.264/AVC standard or to the MVC-compatible 3DV extension of the H.264/AVC standard. In accordance with the techniques of this disclosure, NAL unit type 21 is reused when the svc_extension_flag syntax element is equal to 1. The svc_extension_flag syntax element may now be the first flag of the NAL unit header extension. If the svc_extension_flag syntax element is equal to 1, the NAL unit relates to SVC and includes a SVC header extension, nal_unit_header_svc_extension( ). If the svc_extension_flag syntax element is equal to 0, the NAL unit relates to MVC-compatible 3DV and the NAL unit includes an MVC-compatible 3DV header extension, nal_unit_header_mvc_extension( ). In both MVC-compatible 3DV and SVC, there are two NAL unit types (14 and 20) sharing the same NAL unit header design. NAL unit type 14 is for the prefix NAL unit and NAL unit type 20 is for the other VCL NAL units at the enhancement layers or non-base views.

In the example syntax of Table 1, NAL unit type 21 is reused for both AVC-compatible 3DV header extensions and MVC-compatible 3DV header extensions. That is, if the nal_unit_type syntax element is equal to 21, the NAL unit may include an AVC-compatible 3DV header extension or a MVC-compatible 3DV header extension. In the example syntax of Table 1, the avc_based_3dv_flag syntax element indicates whether the NAL unit includes a AVC-compatible 3DV header extension, nal_unit_header_avc_3dv_extension( ), or a MVC-compatible 3DV header extension, nal_unit_header_mvc_extension( ).

If the avc_based_3dv_flag syntax element is equal to 1, the NAL unit includes an AVC-compatible 3DV header extension. That is, the value of the avc_based_3dv_flag syntax element may be equal to 1 for coded video sequences conforming to one or more profiles specified in Annex J (or the annex specifying AVC-based 3DV extension in the event Annex J is not used for the AVC-based 3DV extension) of the H.264/AVC standard. In some examples, video decoders that conform to one or more profiles specified in Annex J of the H.264/AVC standard are not configured to process NAL units for which the nal_unit_type syntax element is equal to 21 and for which the avc_based_3dv_extension_flag syntax element is equal to 0. Accordingly, such video decoders may ignore (i.e., remove from the bitstream and discard) NAL units for which the nal_unit_type syntax element is equal to 21 and for which the avc_based_3dv_extension_flag syntax element is equal to 0.

If the avc_based_3dv_flag syntax element is equal to 0, the NAL unit includes a MVC-compatible 3DV header extension. That is, the value of the avc_based_3dv_flag syntax element may be equal to 0 for coded video sequences conforming to one or more decoder profiles specified in Annex I (MVC-based 3DV) of the H.264/AVC standard. Consequently, video decoders that conform to one or more profiles specified in Annex I of the H.264/AVC standard but are not configured to process NAL units for which the nal_unit_type syntax element is equal to 21 may ignore (i.e., remove from the bitstream and discard) NAL units for which the nal_unit_type syntax element is equal to 21 and for which the avc_based_3dv_extension_flag syntax element is equal to 1.

In other examples, the avc_based_3dv_flag syntax element may be renamed in the AVC-compatible 3DV extension, as mvc_3dv_extension_flag. In such examples, if the mvc_3dv_extension_flag is equal to 1, the NAL unit includes a MVC-compatible 3DV header extension. If the mvc_3dv_extension_flag is equal to 0, the NAL unit includes an AVC-compatible 3DV header extension.

A NAL unit in MVC-compatible 3DV may include a one-byte NAL unit header and a three-byte MVC NAL unit header extension if the NAL unit type is a prefix NAL unit or a MVC VCL NAL unit. A prefix NAL unit in MVC-compatible 3DV may contain only a NAL unit header and the MVC NAL unit header extension. Table 2, below, indicates an example syntax structure for the nal_unit_header_mvc_extension function.

TABLE 2

| nal_unit_header_mvc_extension( ) { | C | Descriptor |
|---|---|---|
| non_idr_flag | All | u(1) |
| priority_id | All | u(6) |
| view_id | All | u(10) |
| temporal_id | All | u(3) |
| anchor_pic_flag | All | u(1) |
| inter_view_flag | All | u(1) |
| reserved_one_bit | All | u(1) |
| } | | |

In the example of Table 2 and the following tables, a syntax element having a descriptor of the form u(n), where n is a non-negative integer, are unsigned values of length n. In the example syntax structure of Table 2, the non_idr_flag indicates whether the NAL unit belongs to an instantaneous decoding refresh (IDR) NAL unit. A random access point is a picture that includes only I slices. The priority_id syntax element may be used for one-path adaptation, wherein adaptation can be done simply by checking priority_id. The view_id syntax element may indicate a view identifier of a current view. The NAL unit may encapsulate a coded representation of a slice of a view component of the current view. The temporal_id syntax element may indicate a temporal level of the NAL unit. The temporal level may indicate a frame rate associated with the NAL unit. The anchor_pic_flag syntax element may indicate whether the NAL unit belongs to an anchor picture that can be used for random access. An anchor picture is a coded picture in which all slices may reference only slices in the same access unit. That is, inter-view prediction may be used to encode an anchor picture, but inter prediction may not be used to encode the anchor picture. The inter_view_flag syntax element indicates whether a current view component is used for inter-view prediction for NAL units in other views. The NAL unit may encapsulate a coded representation of a slice of the current view component.

A NAL unit does not encapsulate a coded slice of a texture view component if the NAL unit includes a MVC-compatible 3DV header extension. A NAL unit that encapsulates a coded slice of a depth view component may have a first syntax structure if the NAL unit includes the AVC-compatible 3DV header extension and may have a second syntax structure if the NAL unit includes the MVC-compatible 3DV header extension, the second syntax structure being different than the first syntax structure. In some examples, video encoder 20 may generate (and video decoder 30 may receive) another NAL unit that belongs to a different NAL unit type. The NAL unit header of the other NAL unit may include a second MVC-compatible 3DV header extension. The second MVC-compatible 3DV header extension may have the same syntax structure as the first MVC-compatible 3DV header extension. The other NAL unit may encapsulate a coded slice of a texture view component.

Table 3, below, indicates an example syntax structure for the nal_unit_header_avc_3dv_extension function.

TABLE 3

| nal_unit_header_avc_3dv_extension( ) { | C | Descriptor |
|---|---|---|
| non_idr_flag | All | u(1) |
| anchor_pic_flag | All | u(1) |
| temporal_id | All | u(3) |
| inter_view_flag | All | u(1) |
| depth_flag | All | u(1) |
| view_idx | All | u(8) |
| } | | |

In the example syntax structure of Table 3, the non_idr_flag syntax element, the anchor_pic_flag syntax element, the temporal_id syntax element, and the inter_view_flag syntax element may have the same semantics as the corresponding syntax elements of the nal_unit_header_mvc_extension. The depth_flag syntax element may indicate whether the NAL unit encapsulates encoded data of a depth view component or a texture view component. That is, video decoder 30 may determine, based on the depth_flag syntax element whether the NAL unit encapsulates encoded data of a depth view component or a texture view component. For example, if the depth_flag syntax element is equal to 1, the NAL unit encapsulates encoded data of a depth view component. In this example, if the depth_flag syntax element is equal to 0, the NAL unit encapsulates encoded data of a texture view component. In some examples, if the depth_flag syntax element is not present in the NAL unit, video decoder 30 may automatically determine that the depth_flag syntax element is equal to 0. The syntax of the MVC-compatible 3DV header extension does not allow for the depth flag syntax element. That is, in some examples, a MVC-compatible 3DV header extension cannot include a depth flag syntax element. The AVC-compatible 3DV header extension has a syntax structure that is the same regardless of whether the NAL unit encapsulates a coded slice of a texture view component or a coded slice of a depth view component.

In the example syntax of Table 3, the same NAL unit type may be shared for VCL NAL units of the non-base view texture and prefix NAL unit. In this case, a view_idx is signaled in the NAL unit header, instead of view_id. The view_idx syntax element indicates a view_order_index for the NAL unit. NAL units that have the same value of the view_idx syntax element belong to the same view. The view_idx syntax element may have the same semantics as the view order index (VOIdx) in the MVC-compatible 3DV specification (i.e., the MVC-based 3DV specification). In some examples, for a prefix NAL unit, the view_idx syntax element is always equal to 0.

In some examples, if the view_idx syntax element and the depth_flag syntax element of the nal_unit_header_avc_3dv_extension function are both equal to 0, the RBSP of the NAL unit is a prefix NAL unit AVC 3DV RBSP. In the example syntax of Table 1, the same NAL unit type is used for the VCL NAL units of the non-base view texture components and prefix NAL units. The prefix NAL unit AVC 3DV RSBP may be an RBSP that includes 0 bytes. Table 4, below, provides an example syntax structure of the prefix NAL unit AVC 3DV RBSP.

TABLE 4

| prefix_nal_unit_avc_3dv_rbsp( ) { | C | Descriptor |
|---|---|---|
| } | | |

In another example, a new NAL unit type is used for prefix AVC-compatible 3DV NAL units. Table 5, below, is an example syntax structure for a NAL unit in which a new NAL unit type is used for prefix AVC-compatible 3DV NAL units. In the example syntax of Table 5, a NAL unit is a prefix AVC-compatible 3DV NAL unit if the nal_unit_type syntax element of the NAL unit is equal to 17. Thus, the nal_unit_type syntax element may indicate that the NAL unit is a prefix AVC-compatible 3DV NAL unit and video decoder 30 may determine, based on the nal_unit_type syntax element, that the NAL unit is a prefix AVC-compatible 3DV NAL unit.

TABLE 5

| nal_unit( NumBytesInNALunit ) { | C | Descriptor |
|---|---|---|
| forbidden_zero_bit | All | f(1) |
| nal_ref_idc | All | u(2) |
| nal_unit_type | All | u(5) |
| NumBytesInRBSP = 0 | | |
| nalUnitHeaderBytes = 1 | | |
| if( nal_unit_type = = 14 \|\| nal_unit_type = = 20 ) { | | |
|   svc_extension_flag | All | u(1) |
|   if( svc_extension_flag ) | | |
|     nal_unit_header_svc_extension( ) /* specified in Annex G */ | All | |
|   Else | | |
|     nal_unit_header_mvc_extension( ) /* specified in Annex H */ | All | |
|   nalUnitHeaderBytes += 3 | | |
| } | | |
| if ( nal_unit_type = = 21 \|\| nal_unit_type = = 17 ) { | | |
|   avc_based_3dv_flag | All | u(1) |
|   if ( avc_based_3dv_flag ) { | | |
|     nal_unit_header_avc_3dv_extension( ) /* specified in Annex J */ | | |
|     nalUnitHeaderBytes +=2 | | |
|   } | | |
|   else if ( nal_unit_type = = 21) { | | |
|     nal_unit_header_mvc_extension( ) /* specified in Annex H */ | All | |
|     nalUnitHeaderBytes +=3 | | |
|   } | | |
| } | | |

TABLE 5-continued

| nal_unit( NumBytesInNALunit ) { | C | Descriptor |
|---|---|---|
|   for( i = nalUnitHeaderBytes; i < NumBytesInNALunit; i++ ) { | | |
|     if( i + 2 < NumBytesInNALunit && next_bits( 24 ) = = 0x000003 ) { | | |
|       rbsp_byte[ NumBytesInRBSP++ ] | All | b(8) |
|       rbsp_byte[ NumBytesInRBSP++ ] | All | b(8) |
|       i += 2 | | |
|       emulation_prevention_three_byte /* equal to 0x03 */ | All | f(8) |
|     } else | | |
|       rbsp_byte[ NumBytesInRBSP++ ] | All | b(8) |
|   } | | |
| } | | |

In another example, video encoder 20 generates NAL units that use a new NAL unit type for VCL NAL units of non-base view texture view components or depth view components. Table 6, below, is an example syntax for a NAL unit in which a new NAL unit type is used for VCL NAL units of non-base view texture view components or depth view components. In the example syntax structure of Table 6, a NAL unit is a VCL NAL unit of a non-base view texture view component or a depth view component if the nal_unit_type syntax element of the NAL unit is equal to 22.

TABLE 6

| nal_unit( NumBytesInNALunit ) { | C | Descriptor |
|---|---|---|
|   forbidden_zero_bit | All | f(1) |
|   nal_ref_idc | All | u(2) |
|   nal_unit_type | All | u(5) |
|   NumBytesInRBSP = 0 | | |
|   nalUnitHeaderBytes = 1 | | |
|   if( nal_unit_type = = 14 \|\| nal_unit_type = = 20 ) { | | |
|     svc_extension_flag | All | u(1) |
|     if( svc_extension_flag ) | | |
|       nal_unit_header_svc_extension( ) /* specified in Annex G*/ | All | |
|     Else | | |
|       nal_unit_header_mvc_extension( ) /* specified in Annex H */ | All | |
|     nalUnitHeaderBytes += 3 | | |
|   } | | |
|   if ( nal_unit_type = = 22 ) { | | |
|     nal_unit_header_avc_3dv_extension( ) /* specified in Annex J */ | | |
|     nalUnitHeaderBytes +=2 | | |
|   } | | |
|   for( i = nalUnitHeaderBytes; i < NumBytesInNALunit; i++ ) { | | |
|     if( i + 2 < NumBytesInNALunit && next_bits( 24 ) = = 0x000003 ) { | | |
|       rbsp_byte[ NumBytesInRBSP++ ] | All | b(8) |
|       rbsp_byte[ NumBytesInRBSP++ ] | All | b(8) |
|       i += 2 | | |
|       emulation_prevention_three_byte /* equal to 0x03 */ | All | f(8) |
|     } else | | |
|       rbsp_byte[ NumBytesInRBSP++ ] | All | b(8) |
|   } | | |
| } | | |

In the example syntax of Table 6, video encoder 20 may expand the nal_unit_header_avc_3dv_extension function as shown in the example syntax of Table 7, below. In contrast to the nal_unit_header_avc_3dv_extension function shown in the example of Table 3, the example syntax of Table 7 includes a reserved_one_bit syntax element. The reserved_one_bit syntax element is a reserved bit.

TABLE 7

| nal_unit_header_avc_3dv_extension( ) { | C | Descriptor |
|---|---|---|
|   non_idr_flag | All | u(1) |
|   anchor_pic_flag | All | u(1) |
|   temporal_id | All | u(3) |

TABLE 7-continued

| nal_unit_header_avc_3dv_extension( ) { | C | Descriptor |
|---|---|---|
|   inter_view_flag | All | u(1) |
|   depth_flag | All | u(1) |
|   reserved_one_bit | All | u(1) |
|   view_idx | All | u(8) |
| } | | |

In another example, one new NAL unit type may be used for VCL NAL units of non-base view texture view components and another new NAL unit type may be used for VCL NAL units of depth view components. In this example, video encoder 20 may generate NAL units that conform to the example syntax structure shown in Table 8, below. In the example syntax structure of Table 8, the NAL unit type of a VCL NAL unit of a non-base view texture view component may be equal to 22. Furthermore, in the example syntax structure of Table 8, the NAL unit type of a VCL NAL unit of a texture view component NAL unit may be equal to 23.

TABLE 8

| nal_unit( NumBytesInNALunit ) { | C | Descriptor |
|---|---|---|
|   forbidden_zero_bit | All | f(1) |
|   nal_ref_idc | All | u(2) |
|   nal_unit_type | All | u(5) |
|   NumBytesInRBSP = 0 | | |
|   nalUnitHeaderBytes = 1 | | |
|   if( nal_unit_type = = 14 \|\| nal_unit_type = = 20 ) { | | |
|     svc_extension_flag | All | u(1) |
|     if( svc_extension_flag ) | | |
|       nal_unit_header_svc_extension( ) /* specified in Annex G */ | All | |
|     Else | | |
|       nal_unit_header_mvc_extension( ) /* specified in Annex H */ | All | |
|     nalUnitHeaderBytes += 3 | | |
|   } | | |
|   if ( nal_unit_type = = 22 \|\| nal_unit_type = = 23) { | | |
|     nal_unit_header_avc_3dv_extension( ) /* specified in Annex J */ | | |
|     nalUnitHeaderBytes +=2 | | |
|   } | | |
|   for( i = nalUnitHeaderBytes; i < NumBytesInNALunit; i++ ) { | | |
|     if( i + 2 < NumBytesInNALunit && next_bits( 24 ) = = 0x000003 ) { | | |
|       rbsp_byte[ NumBytesInRBSP++ ] | All | b(8) |
|       rbsp_byte[ NumBytesInRBSP++ ] | All | b(8) |
|       i += 2 | | |
|       emulation_prevention_three_byte /* equal to 0x03 */ | All | f(8) |
|     } else | | |
|       rbsp_byte[ NumBytesInRBSP++ ] | All | b(8) |
|   } | | |
| } | | |

In the example syntax of Table 8, video encoder 20 may expand the nal_unit_header_avc_3dv_extension function as shown in the example syntax structure of Table 9, below.

TABLE 9

| nal_unit_header_avc_3dv_extension( ) { | C | Descriptor |
|---|---|---|
|   non_idr_flag | All | u(1) |
|   anchor_pic_flag | All | u(1) |
|   temporal_id | All | u(3) |
|   inter_view_flag | All | u(1) |
|   reserved_two_zero_bits | All | u(2) |
|   view_idx | All | u(8) |
| } | | |

In the example syntax structure of Table 9, the non_idr_flag syntax element, the anchor_pic_flag syntax element, the temporal_id syntax element, the inter_view_flag syntax element, and the view_idx syntax element may have the same semantics as described above. The reserved_two_zero_bits syntax element may be a reserved 2-bit unsigned value. Table 9 differs from Table 7 in that Table 9 does not include the depth_view syntax element and includes the reserved_two_zero_bits syntax element instead of the reserved_one_bit syntax element.

In another example, for a prefix AVC-compatible 3DV NAL unit, video encoder 20 does not signal the view_idx syntax element shown in Tables 7 and 9; thus one byte can be saved. In some examples, the number of bits in the view_idx syntax element may be different than the 8-bit unsigned value of Tables 7 and 9. For instance, in examples where video encoder 20 does not signal the view_idx syntax element, the view_idx syntax element can be a 10-bit value. In the example syntax of Table 9, the view_idx may be a 9-bit value. In other examples, the number of bits for the view_idx syntax element may be other values, such as 4, 5, 6, 7, or less.

In some examples, video encoder 20 signals the view_idx syntax element in an adaptive fashion for different decoder profiles. For example, if video encoder 20 encodes the video data for a first decoder profile, the view_idx syntax element may contain a smaller number of bits in the NAL unit header than if video encoder 20 encodes the video data for a second decoder profile. In this example, the view_idx syntax element may include one additional byte when video encoder 20 encodes the video data for the second decoder profile.

Furthermore, in the example syntaxes of Tables 7 and 9, above, video encoder 20 may signal the view_idx syntax element as a 2-bit unsigned value. As a result, the NAL unit header extension may contain only 1 byte. Alternatively, in some video decoder profiles, the length of the NAL unit header extension may be equal to 1 byte. Video encoder 20 may signal an extension byte for the view_idx syntax element for other decoder profiles that allow a larger number of coded views. In examples where video encoder 20 signals an extension byte for the view_idx syntax element, the bits signaled in the first extension byte of the view_idx syntax element may include the least-significant bits of the view_idx syntax element (i.e., view_idx_lsb) while the second extension byte of the view_idx syntax element includes the most significant bits (view_idx_msb). Thus, the view_idx syntax element may be equal to view_idx_msb<< (numBitsViewIdxFirstByte)+view_idx_lsb, where view_idx_msb is the most-significant bits of the view_idx syntax element, numBitsViewIdxFirstByte is the number of view of the first byte of the view_idx syntax element, and view_idx_lsb is the least-significant bits of the view_idx syntax element.

In some examples, video encoder 20 does not signal the inter_view_flag syntax element in the NAL unit header extension. In some such examples, the bit otherwise used for the inter_view_flag syntax element may be used as an extra bit of the view_idx syntax element. In this way, by not signaling the inter_view_flag syntax element, video encoder 20 may signal the view indexes of additional views. For instance, in some examples, video encoder 20 may signal the view_idx as a 3-bit value. As a result, the NAL unit header extension may only contain one byte. Alternatively, in some video decoder profiles, the length of the NAL unit header extension is equal to 1 byte, while for profiles enabling a larger number of coded views, an extension byte for the view_idx is signaled. In examples where video encoder 20 signals an extension byte for the view_idx, the bits signaled in the first extension byte of the view_idx may include the least-significant bits of the view_idx while the second extension byte of the view_idx includes the most significant bits. For example, when the number of views is less than 8, three bits in the NAL unit header extension are sufficient. In a video decoder profile that enables more than eight views, e.g., 100 views, video encoder 20 may signal a view_idx_msb syntax element. Video decoder 30 may calculate view_idx as follows: view_idx=view_idx_msb<<(numBitsViewIdxFirstByte)+view_idx_lsb, where view_idx_msb is the most-significant bits of the view_idx, view_idx_lsb is the least-significant bits of the view_idx, and numBitViewIdxFirstByte indicate a number of bits of the view_idx in the first byte.

Figure 3:
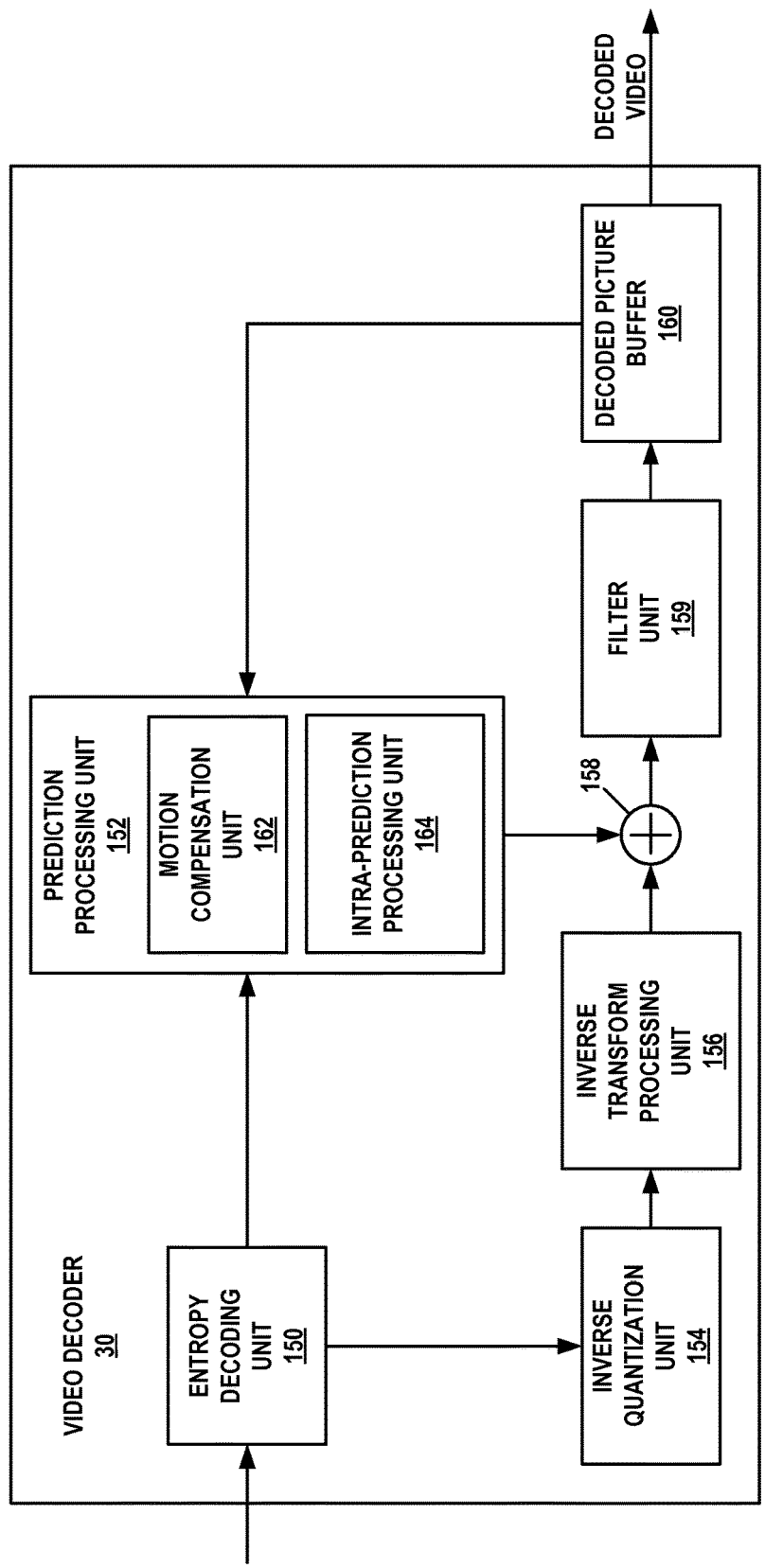
FIG. 3 is a block diagram illustrating an example video decoder that may implement the techniques described in this disclosure.

FIG. 3 is a block diagram that illustrates an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of H.264/AVC coding. However, the techniques of this disclosure may be applicable to other coding standards or methods.

In the example of FIG. 3, video decoder 30 includes an entropy decoding unit 150, a prediction processing unit 152, an inverse quantization unit 154, an inverse transform processing unit 156, a reconstruction unit 158, a filter unit 159, and a decoded picture buffer 160. Prediction processing unit 152 includes a motion compensation unit 162 and an intra-prediction processing unit 164. In other examples, video decoder 30 may include more, fewer, or different functional components.

Video decoder 30 may receive a bitstream. Entropy decoding unit 150 may parse the bitstream to extract syntax elements from the bitstream. As part of parsing the bitstream, entropy decoding unit 150 may entropy decode entropy-encoded syntax elements in the bitstream. Prediction processing unit 152, inverse quantization unit 154, inverse transform processing unit 156, reconstruction unit 158, and filter unit 159 may generate decoded video data (i.e., reconstruct the video data) based on the syntax elements extracted from the bitstream. The syntax elements extracted from the bitstream may include syntax elements that represent coefficient blocks.

In accordance with the techniques of this disclosure, video decoder 30 may receive a NAL unit. Entropy decoding unit 150 may parse a first syntax element and a second syntax element from the NAL unit. Entropy decoding unit 150 may determine, based on the second syntax element, whether a NAL unit header of the NAL unit includes an AVC-compatible 3DV header extension or includes a MVC-compatible 3DV header extension. In response to determining that the NAL unit includes an AVC-compatible 3DV header extension, entropy decoding unit 150 may parse the AVC-compatible 3DV header extension from the NAL unit. In response to determining that the NAL unit includes a MVC-compatible 3DV header extension, entropy decoding unit 150 may parse the MVC-compatible 3DV header extension from the NAL unit. Prediction processing unit 152, inverse quantization unit 154, inverse transform processing unit 156, reconstruction unit 158, and filter unit 159 may reconstruct at least some video data based on the syntax elements of the AVC-compatible 3DV header extension or the MVC-compatible header extension.

Inverse quantization unit 154 may inverse quantize, i.e., de-quantize, coefficient blocks. Inverse quantization unit 154 may use a QP value to determine a degree of quantization and, likewise, a degree of inverse quantization for inverse quantization unit 154 to apply. After inverse quantization unit 154 inverse quantizes a coefficient block, inverse transform processing unit 156 may apply one or more inverse transforms to the coefficient block in order to generate a residual sample block. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a video block is encoded using intra prediction, intra-prediction processing unit 164 may perform intra prediction to generate a predictive pixel block for the video block. For example, intra-prediction processing unit 164 may determine an intra prediction mode for the video block based on syntax elements in the bitstream. Intra-prediction processing unit 164 may use the intra prediction mode to generate the predictive pixel block for the video block based on spatially-neighboring video blocks.

Motion compensation unit 162 may construct a first reference picture list (list 0) and a second reference picture list (list 1) based on syntax elements extracted from the bitstream. In examples where the bitstream is encoded using MVC-compatible 3DV or AVC-compatible 3DV, list 0 and/or list 1 may include inter-view reference pictures. In examples where the bitstream is encoded using AVC-compatible 3DV, the inter-view reference pictures in list 0 and/or list 1 may include reference pictures synthesized based on depth maps. Furthermore, if a video block is encoded using inter prediction, entropy decoding unit 150 may extract motion information for the video block. Motion compensation unit 162 may determine, based on the motion information of the video block, one or more reference blocks for the video block. Motion compensation unit 162 may generate, based on the one or more reference blocks for the video block, a predictive pixel block for the video block.

Reconstruction unit 158 may reconstruct a video block based on the residual pixel block for the video block and the predictive pixel block of the video block. In particular, reconstruction unit 158 may add samples (e.g., luma or chroma components) of the residual pixel block to corresponding samples of the predictive pixel block to reconstruct the video block. Filter unit 159 may perform a deblocking operation to reduce blocking artifacts associated with the video block. Video decoder 30 may store video blocks in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the video blocks in decoded picture buffer 160, intra prediction or inter prediction operations on PUs of other CUs.

Figure 4:
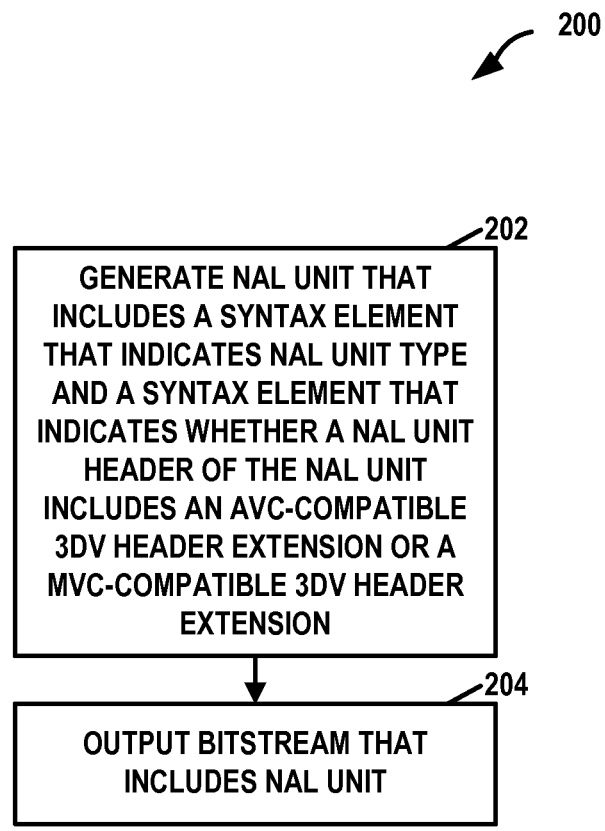
FIG. 4 is a flowchart illustrating an example operation performed by the video encoder as part of a process to encode video data, in accordance with one or more techniques of this disclosure.

FIG. 4 is a flowchart illustrating an example operation 200 performed by video encoder 20 as part of a process to encode video data, in accordance with one or more techniques of this disclosure. The flowchart of FIG. 4 and the flowcharts of the following figures are provided as examples. In other examples, the techniques of this disclosure may be implemented using more, fewer, or different steps than those shown in the example of FIG. 4 and the following figures.

In the example of FIG. 4, video encoder 20 may generate a NAL unit that includes at least a first syntax element and a second syntax element (202). The first syntax element may indicate that the NAL unit belongs to a particular NAL unit type. Coded slices of texture view components and depth view components are encapsulated within NAL units that belong to the particular NAL unit type. The second syntax element may indicate whether a NAL unit header of the NAL unit includes an AVC-compatible 3DV header extension or a MVC-compatible 3DV header extension. The AVC-compatible 3DV header extension includes syntax elements associated with AVC-compatible 3DV. The MVC-compatible 3DV header extension has a different syntax structure than the AVC-compatible 3DV header extension and includes syntax elements associated with MVC-compatible 3DV. Video encoder 20 may output a bitstream that includes the NAL unit (204).

Figure 5:
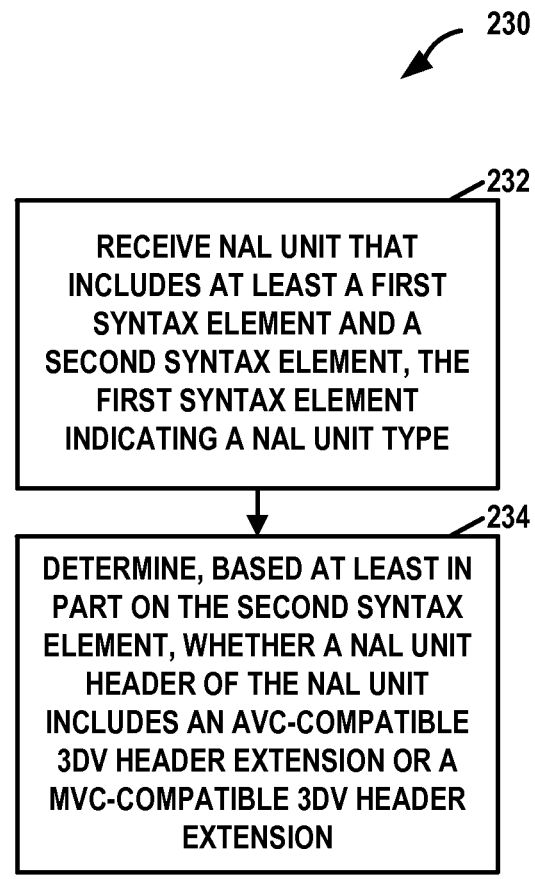
FIG. 5 is a flowchart illustrating an example operation performed by the video decoder as part of a process to decode video data, in accordance with one or more techniques of this disclosure.

FIG. 5 is a flowchart illustrating an example operation 230 performed by video decoder 30, in accordance with one or more techniques of this disclosure. In the example of FIG. 5, video decoder 30 may receive a NAL unit that includes at least a first syntax element and a second syntax element (232). The first syntax element may indicate that the NAL unit belongs to a particular NAL unit type. Coded slices of texture view components and depth view components are encapsulated within NAL units that belong to the particular NAL unit type. Video decoder 30 may determine, based at least in part on the second syntax element, whether a NAL unit header of the NAL unit includes an AVC-compatible 3DV header extension or a MVC-compatible 3DV header extension (234). The AVC-compatible 3DV header extension may include syntax elements associated with AVC-compatible 3DV. The MVC-compatible 3DV header extension may have a different syntax structure than the AVC-compatible 3DV header extension and may include syntax elements associated with MVC-compatible 3DV.

Figure 6:
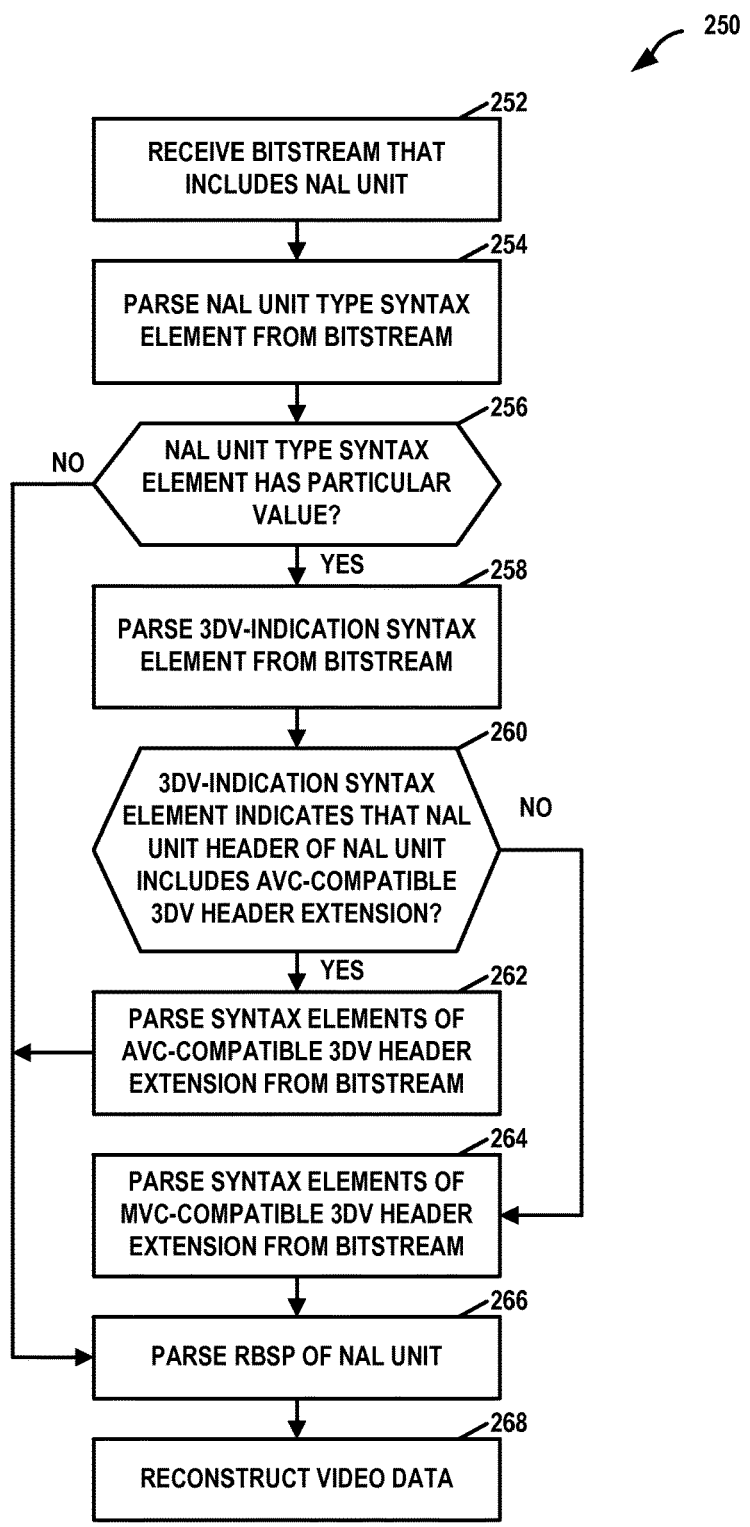
FIG. 6 is a flowchart illustrating another example operation performed by the video decoder as part of a process to decode encoded video data, in accordance with one or more techniques of this disclosure.

FIG. 6 is a flowchart illustrating another example operation 250 performed by video decoder 30 as part of a process to decode encoded video data, in accordance with one or more techniques of this disclosure. FIG. 6 may be a more specific example of the operation 230 of FIG. 5. In the example of FIG. 6, video decoder 30 may receive a bitstream that includes a NAL unit (252). Video decoder 30 may parse a NAL unit type syntax element from the bitstream (254). Video decoder 30 may then determine whether the NAL unit type syntax element has a particular value (e.g., 21) (256). In response to determining that the NAL unit type syntax element has the particular value ("YES" of 256), video decoder 30 may parse a 3DV-indication element (e.g., avc_based_3dv_flag) from the bitstream (258). The 3DV-indication element may indicate whether the NAL unit header of the NAL unit includes an AVC-compatible 3DV header extension or a MVC-compatible 3DV header extension. After parsing the 3DV-indication syntax element from the bitstream, video decoder 30 may determine whether the 3DV-indication syntax element indicates that the NAL unit header of the NAL unit includes an AVC-compatible 3DV header extension (260).

In response to determining that the 3DV-indication syntax element indicates that the NAL unit header of the NAL unit includes an AVC-compatible 3DV header extension ("YES" of 260), video decoder 30 may parse syntax elements of the AVC-compatible 3DV header extension from the bitstream (262). In response to determining that the 3DV-indication syntax element indicates that the NAL unit header of the NAL unit does not include an AVC-compatible 3DV header extension ("NO" of 260), video decoder 30 may parse syntax elements of a MVC-compatible 3DV header extension from the bitstream (264).

In response to determining that the NAL unit type syntax element is not equal to the particular value ("NO" of 256) or after parsing the AVC-compatible 3DV header extension or the MVC-compatible 3DV header extension from the bitstream, video decoder 30 may parse an RBSP encapsulated within the NAL unit from the bitstream (266). Video decoder 30 may then reconstruct the video data based at least in part on the syntax elements parsed from the RBSP encapsulated within the NAL unit (268). Thus, if the 3DV-indication syntax element indicates that the NAL unit header of the NAL unit includes an AVC-compatible 3DV header extension, video decoder 30 may decode the video data based at least in part on the AVC-compatible 3DV header extension.

Figure 7:
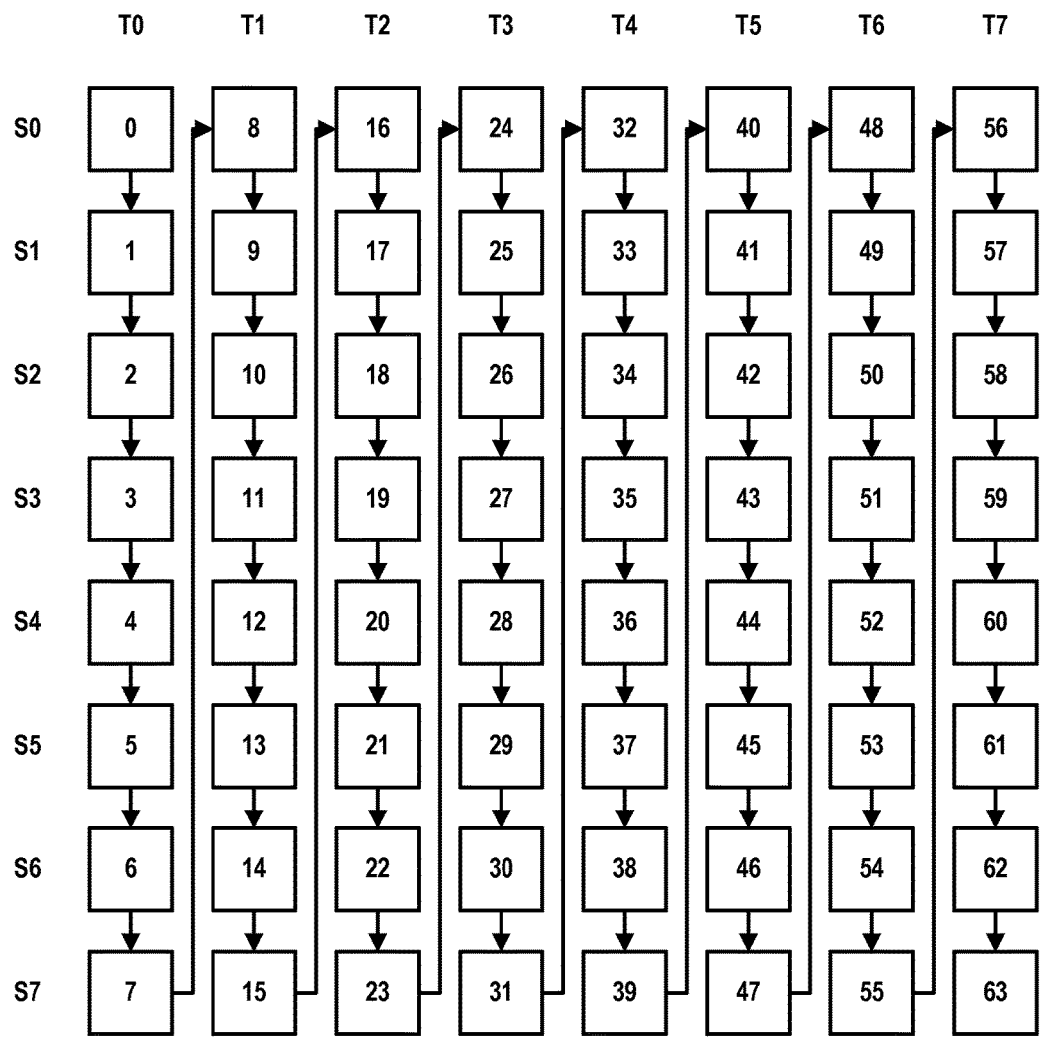
FIG. 7 is a conceptual diagram illustrating an example Multiview Video Coding (MVC)-compatible 3-dimensional video (3DV) decoding order.

FIG. 7 is a conceptual diagram illustrating an example MVC-compatible 3DV decoding order. In the example of FIG. 7, each square corresponds to a view component. Columns of squares correspond to access units. Each access unit may be defined to contain the coded pictures of all the views of a time instance. Rows of squares correspond to views. In the example of FIG. 7, the access units are labeled T0 . . . T7 and the views are labeled S0 . . . S7. Because each view component of an access unit is decoded before any view component of the next access unit, the decoding order of FIG. 7 may be referred to as time-first coding. As shown in the example of FIG. 7, the decoding order of access units may not be identical to the output or display order of the views.

Figure 8:
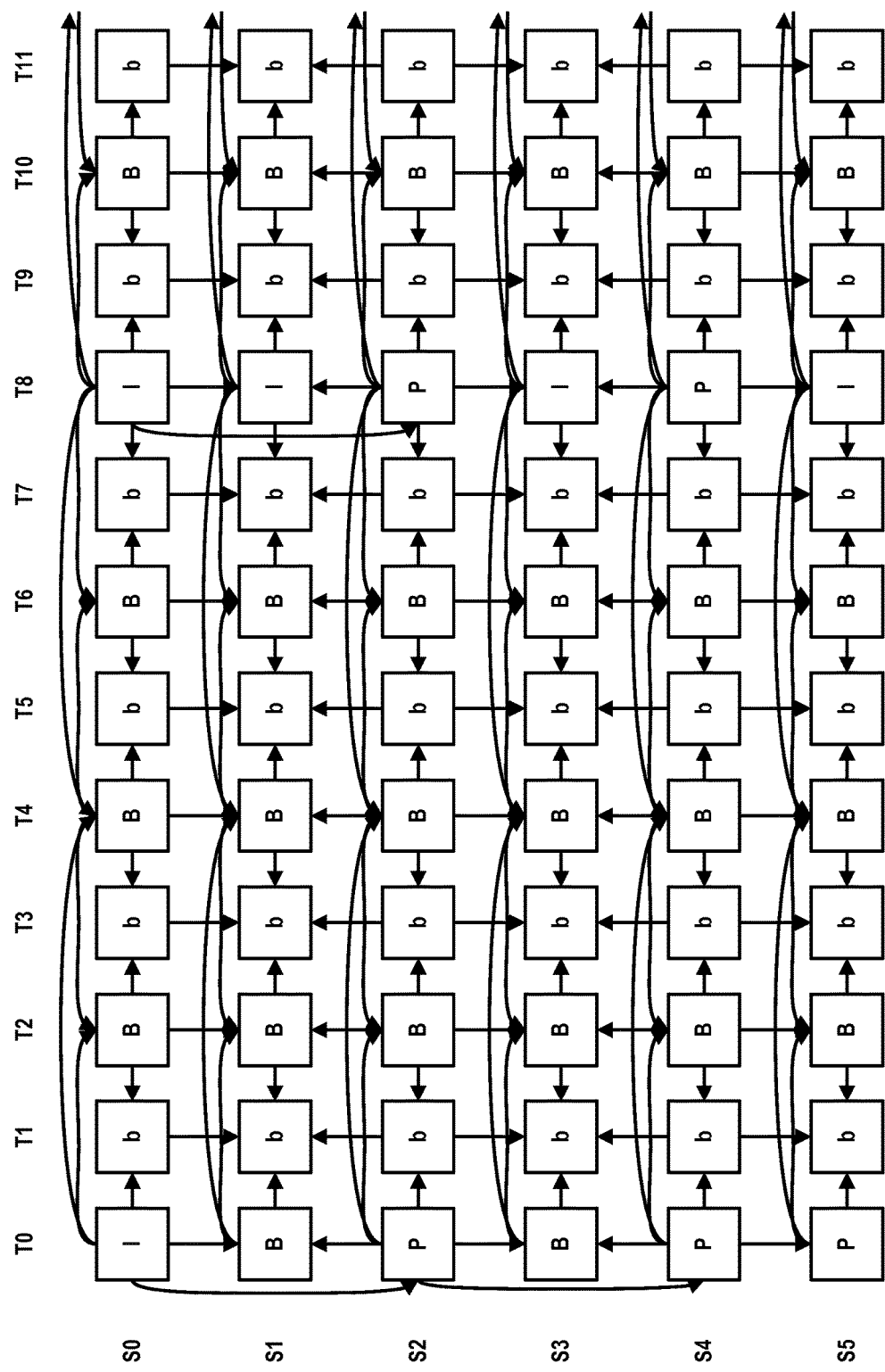
FIG. 8 is a conceptual diagram illustrating an example MVC temporal and inter-view prediction structure.

FIG. 8 is a conceptual diagram illustrating an example MVC temporal and inter-view prediction structure. In the example of FIG. 8, each square corresponds to a view component. Squares labeled "I" are intra predicted view components. Squares labeled "P" are uni-directionally inter predicted view components. Squares labeled "B" and "b" are bi-directionally inter predicted view components. Squares labeled "b" may use squares labeled "B" as reference pictures. An arrow that points from a first square to a second square indicates that the first square is available in inter prediction as a reference picture for the second square. As indicated by the vertical arrows in FIG. 8, view components in different views of the same access unit may be available as reference pictures. The use of one view component of an access unit as a reference picture for another view component of the same access unit may be referred to as inter-view prediction.

In MVC-compatible 3DV, inter-view prediction may implemented as if the view component in another view was an inter prediction reference picture. The potential inter-view reference pictures may be signaled in a SPS MVC extension, as shown in Table 10, below. Reference picture lists may be modified during the reference picture list construction process in order to enable flexible ordering of the inter prediction or inter-view prediction reference pictures.

TABLE 10

| seq_parameter_set_mvc_extension( ) { | Descriptor |
|---|---|
| num_views_minus1 | ue(v) |
| for( i = 0; i <= num_views_minus1; i++ ) | |
|   view_id[ i ] | ue(v) |
| for( i = 1; i <= num_views_minus1; i++ ) { | |
|   num_anchor_refs_l0[ i ] | ue(v) |
|   for( j = 0; j < num_anchor_refs_l0[ i ]; j++ ) | |
|     anchor_ref_l0[ i ][ j ] | ue(v) |

TABLE 10-continued

| seq_parameter_set_mvc_extension( ) { | Descriptor |
|---|---|
|     num_anchor_refs_l1[ i ] | ue(v) |
|     for( j = 0; j < num_anchor_refs_l1[ i ]; j++ ) | |
|         anchor_ref_l1[ i ][ j ] | ue(v) |
|     } | |
|     for( i = 1; i <= num_views_minus1; i++ ) { | |
|         num_non_anchor_refs_l0[ i ] | ue(v) |
|         for( j = 0; j < num_non_anchor_refs_l0[ i ]; j++ ) | |
|             non_anchor_ref_l0[ i ][ j ] | ue(v) |
|         num_non_anchor_refs_l1[ i ] | ue(v) |
|         for( j = 0; j < num_non_anchor_refs_l1[ i ]; j++ ) | |
|             non_anchor_ref_l1[ i ][ j ] | ue(v) |
|     } | |
|     num_level_values_signalled_minus1 | ue(v) |
|     for( i = 0; i <= num_level_values_signalled_minus1; i++ ) { | |
|         level_idc[ i ] | u(8) |
|         num_applicable_ops_minus1[ i ] | ue(v) |
|         for( j = 0; j <= num_applicable_ops_minus1[ i ]; j++ ) { | |
|             applicable_op_temporal_id[ i ][ j ] | u(3) |
|             applicable_op_num_target_views_minus1[ i ][ j ] | ue(v) |
|             for( k = 0; k <= applicable_op_num_target_views_minus1[ i ][ j ]; k++ ) | |
|                 applicable_op_target_view_id[ i ][ j ][ k ] | ue(v) |
|             applicable_op_num_views_minus1[ i ][ j ] | ue(v) |
|         } | |
|     } | |
| } | |

In Table 10, above, syntax elements with type descriptor ue(v) may be variable-length unsigned integers encoded using $0^{th}$ order exponential Golomb (Exp-Golomb) coding with left bit first. The syntax elements with type descriptors u(3) and u(8) may be unsigned integers with 3 and 8 bits, respectively. Video encoder 20 may, in the SPS MVC extension of Table 10, signal, for each view, the number of views that can be used to form reference picture list 0 and reference picture list 1. A prediction relationship for an anchor picture, as signaled in the SPS MVC extension may be different from the prediction relationship for a non-anchor picture (signaled in the SPS MVC extension) of the same view.

A video coder may perform a reference picture list construction process to flexibly arrange temporal and view prediction references. Performing the reference picture list construction process may provide not only potential coding efficiency gains but also error resilience, because reference picture sections and redundant picture mechanisms can then be extended to the view dimension.

The reference picture list construction may include the following steps. First, the video coder may apply the reference picture list initialization process for temporal (intra-view) reference pictures as specified in a H.264/AVC standard, without use of reference pictures from other views. Second, the video coder may append the inter-view reference pictures to the end of the list in the order the inter-view reference pictures occur in the SPS MVC extension. Third, the video coder applies the reference picture list modification (RPLM) process for both intra-view and inter-view reference pictures. The video coder may identify inter-view reference pictures in RPLM commands by their index values as specified in the MVC SPS extension.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for encoding video data, the method comprising:
receiving, by a video encoder comprising one or more processors that comprise circuits, video data that comprises pictures;
generating, by the video encoder, a bitstream that comprises a series of Network Abstraction Layer (NAL) units, the series of NAL units including a plurality of coded slice NAL units that contain coded slices of the pictures of the video data, wherein generating the bitstream comprises:
generating a first syntax element in a particular NAL unit in the series of NAL units, the first syntax element being a NAL unit type syntax element indicating a NAL unit type of the particular NAL unit, the first syntax element having a value equal to 21, wherein NAL units having NAL unit type syntax elements with values equal to 21 belong to a particular NAL unit type, wherein encoded slices of texture view components of the video data and depth view components of the video data are encapsulated within NAL units that belong to the particular NAL unit type;
generating a second syntax element in the particular NAL unit in addition to the first syntax element, the second syntax element being a flag, the second syntax element having a first value indicating a NAL unit header of the particular NAL unit includes an Advanced Video Coding (AVC)-compatible 3DV header extension, the second syntax element having a second, different value indicating the NAL unit header of the particular NAL unit includes a Multi-View Coding (MVC)-compatible 3DV header extension instead of the AVC-compatible 3DV header extension, MVC-compatible 3DV being an extension of an MVC extension of AVC,
the AVC-compatible 3DV header extension including syntax elements associated with AVC-compatible 3DV and being of a first length, AVC-compatible 3DV being a different extension of AVC, and
the MVC-compatible 3DV header extension having a different syntax structure from the AVC-compatible 3DV header extension, being of a second length different from the first length, and including syntax elements associated with MVC-compatible 3DV, both AVC-compatible 3DV and MVC-compatible 3DV allowing each of a plurality of views to contain both texture view components and depth view components; and
outputting, by the video encoder, the bitstream.

2. The method of claim 1, wherein the AVC-compatible 3DV header extension has a syntax structure that is the same regardless of whether the particular NAL unit encapsulates a coded slice of a texture view component or a coded slice of a depth view component.

3. The method of claim 1, wherein:
the particular NAL unit does not encapsulate a coded slice of a texture view component if the particular NAL unit includes the MVC-compatible 3DV header extension, the particular NAL unit encapsulates a coded slice of a depth view component, and
the coded slice of the depth view component has a first syntax structure if the particular NAL unit includes the AVC-compatible 3DV header extension and has a second syntax structure if the particular NAL unit includes the MVC-compatible 3DV header extension, the second syntax structure being different than the first syntax structure.

4. The method of claim 3, wherein the particular NAL unit is a first NAL unit, the particular NAL unit type is a first NAL unit type, the MVC-compatible 3DV header extension is a first MVC-compatible 3DV header extension, and the method further comprises:
generating a second NAL unit, the second NAL unit belonging to a second NAL unit type, a NAL unit header of the second NAL unit including a second MVC-compatible 3DV header extension, the second MVC-compatible 3DV header extension having the same syntax structure as the first MVC-compatible 3DV header extension, the second NAL unit encapsulating a coded slice of a texture view component.

5. The method of claim 1, wherein the second syntax element immediately precedes the AVC-compatible 3DV header extension or the MVC-compatible 3DV header extension.

6. The method of claim 1, wherein the particular NAL unit includes a coded representation of a slice of a texture view component and a third syntax element, the third syntax element indicating a view index of the texture view component, wherein if the video data is encoded for a first decoder profile, the third syntax element contains a smaller number of bits in the NAL unit header of the particular NAL unit than if the video data is encoded for a second decoder profile.

7. The method of claim 1, further comprising encoding the video data in a mobile computing device.

8. A method for decoding video data, the method comprising:
receiving, by a video decoder comprising one or more processors that comprise circuits, a bitstream that comprises a series of network abstraction layer (NAL) units, the series of NAL units including a plurality of coded slice NAL units that contain coded slices of pictures of the video data, wherein receiving the bitstream comprises receiving a particular NAL unit in the series of NAL units that includes at least a first syntax element and additionally includes a second syntax element, the first syntax element being a NAL unit type syntax element indicating a NAL unit type of the particular NAL unit, the first syntax element having a value equal to 21, wherein NAL units having NAL unit type syntax elements with values equal to 21 belong to a particular NAL unit type, wherein coded slices of texture view components of the video data and depth view components of the video data are encapsulated within NAL units that belong to the particular NAL unit type; and
determining, based at least in part on the second syntax element, which of the following a NAL unit header of the particular NAL unit includes: an Advanced Video Coding (AVC)-compatible 3DV header extension or a Multi-View Coding (MVC)-compatible 3DV header extension:
the second syntax element being a flag,
the second syntax element having a first value indicates the NAL unit header includes the AVC-compatible 3DV header extension,
the second syntax element having a second value indicating the NAL unit header includes the MVC-compatible 3DV header extension instead of the AVC-compatible 3DV header extension,
MVC-compatible 3DV being an extension of an MVC extension of AVC,
the AVC-compatible 3DV header extension including syntax elements associated with AVC-compatible 3DV and being of a first length,
AVC-compatible 3DV being a different extension of AVC,
the MVC-compatible 3DV header extension having a different syntax structure than the AVC-compatible 3DV header extension, being of a second length different from the first length, and including syntax elements associated with MVC-compatible 3DV, and
both AVC-compatible 3DV and MVC-compatible 3DV allowing each of a plurality of views to contain both texture view components and depth view components; and
in response to determining the NAL unit header includes the AVC-compatible 3DV header extension, decoding the video data based at least in part on the AVC-compatible 3DV header extension.

9. The method of claim 8, wherein the AVC-compatible 3DV header extension has a syntax structure that is the same regardless of whether the particular NAL unit encapsulates a coded slice of a texture view component or a coded slice of a depth view component.

10. The method of claim 8, wherein:
the particular NAL unit does not encapsulate a coded slice of a texture view component if the particular NAL unit includes the MVC-compatible 3DV header extension,
the particular NAL unit encapsulates a coded slice of a depth view component, and
the coded slice of the depth view component has a first syntax structure if the particular NAL unit includes the AVC-compatible 3DV header extension and has a second syntax structure if the particular NAL unit includes the MVC-compatible 3DV header extension, the second syntax structure being different than the first syntax structure.

11. The method of claim 10, wherein the particular NAL unit is a first NAL unit, the particular NAL unit type is a first NAL unit type, the MVC-compatible 3DV header extension is a first MVC-compatible 3DV header extension, and the method further comprises:
receiving a second NAL unit, the second NAL unit belonging to a second NAL unit type, a NAL unit header of the second NAL unit including a second MVC-compatible 3DV header extension, the second MVC-compatible 3DV header extension having the same syntax structure as the first MVC-compatible 3DV header extension, the second NAL unit encapsulating a coded slice of a texture view component.

12. The method of claim 8, further comprising:
in response to determining that the second syntax element indicates that the NAL unit header of the particular NAL unit includes the MVC-compatible 3DV header extension, reconstructing at least a portion of the video data based at least in part on the MVC-compatible 3DV header extension.

13. The method of claim 8, wherein the second syntax element immediately precedes the AVC-compatible 3DV header extension or the MVC-compatible 3DV header extension.

14. The method of claim 8, wherein the particular NAL unit includes a coded representation of a slice of a texture view component and a third syntax element, the third syntax element indicating a view index of the texture view component, wherein if the video data is encoded for a first decoder profile, the third syntax element contains a smaller number of bits in the NAL unit header of the particular NAL unit than if the video data is encoded for a second decoder profile.

15. The method of claim 8, further comprising decoding the video data in a mobile computing device.

16. A video encoding device that encodes video data, the video encoding device comprising:
a storage medium configured to store the video data; and
one or more processors comprising circuits, the one or more processors configured to:
generate a bitstream that comprises generating a series of Network Abstraction Layer (NAL) units, the series of NAL units including a plurality of coded slice NAL units that contain coded slices of pictures of the video data, wherein the one or more processors are configured such that, as part of generating the bitstream, the one or more processors:
generate a first syntax element in a particular NAL unit in the series of NAL units, the first syntax element being a NAL unit type syntax element indicating a NAL unit type of the particular NAL unit, the first syntax element having a value equal to 21, wherein NAL units having NAL unit type syntax elements with values equal to 21 belong to a particular NAL unit type, wherein encoded slices of texture view components of the video data and depth view components of the video data are encapsulated within NAL units that belong to the particular NAL unit type;
generate a second syntax element in the particular NAL unit in addition to the first syntax element, the second syntax element being a flag, the second syntax element having a first value indicates a NAL unit header of the particular NAL unit includes an Advanced Video Coding (AVC)-compatible three-dimensional video (3DV) header extension, the second syntax element having a second, different value indicates the NAL unit header of the particular NAL unit includes a Multi-View Coding (MVC)-compatible 3DV header extension instead of the AVC-compatible 3DV header extension, MVC-compatible 3DV being an extension of an MVC extension of AVC,
the AVC-compatible 3DV header extension including syntax elements associated with AVC-compatible 3DV and being of a first length, AVC-compatible 3DV being a different extension of AVC, and
the MVC-compatible 3DV header extension having a different syntax structure from the AVC-compatible 3DV header extension, being of a second length different from the first length, and including syntax elements associated with MVC-compatible 3DV, both AVC-compatible 3DV and MVC-compatible 3DV allowing each of a plurality of views to contain both texture view components and depth view components; and
output the bitstream.

17. The video encoding device of claim 16, wherein the AVC-compatible 3DV header extension has a syntax structure that is the same regardless of whether the particular NAL unit encapsulates a coded slice of a texture view component or a coded slice of a depth view component.

18. The video encoding device of claim 16, wherein:
the particular NAL unit does not encapsulate a coded slice of a texture view component if the particular NAL unit includes the MVC-compatible 3DV header extension,
the particular NAL unit encapsulates a coded slice of a depth view component, and
the coded slice of the depth view component has a first syntax structure if the particular NAL unit includes the AVC-compatible 3DV header extension and has a second syntax structure if the particular NAL unit includes the MVC-compatible 3DV header extension, the second syntax structure being different than the first syntax structure.

19. The video encoding device of claim 18, wherein the particular NAL unit is a first NAL unit, the particular NAL unit type is a first NAL unit type, the MVC-compatible 3DV header extension is a first MVC-compatible 3DV header extension, and the one or more processors are further configured to:
generate a second NAL unit, the second NAL unit belonging to a second NAL unit type, a NAL unit header of the second NAL unit including a second MVC-compatible 3DV header extension, the second MVC-compatible 3DV header extension having the same syntax structure as the first MVC-compatible 3DV header extension, the second NAL unit encapsulating a coded slice of a texture view component.

20. The video encoding device of claim 16, wherein the second syntax element immediately precedes the AVC-compatible 3DV header extension or the MVC-compatible 3DV header extension.

21. The video encoding device of claim 16, wherein the particular NAL unit includes a coded representation of a slice of a texture view component and a third syntax element, the third syntax element indicating a view index of the texture view component, wherein if the video data is encoded for a first decoder profile, the third syntax element contains a smaller number of bits in the NAL unit header of the particular NAL unit than if the video data is encoded for a second decoder profile.

22. The video encoding device of claim 16, the video encoding device being a mobile computing device.

23. A video decoding device that decodes video data, the video decoding device comprising:
a storage medium configured to store the video data; and
one or more processors comprising circuits, the one or more processors configured to:
receive a bitstream that comprises a series of network abstraction layer (NAL) units, the series of NAL units including a plurality of coded slice NAL units that contain coded slices of pictures of the video data, wherein the one or more processors are configured such that, as part of receiving the bitstream, the one or more processors receive a particular NAL unit in the series of NAL units that includes at least a first syntax element and additionally includes a second syntax element, the first syntax element being a NAL unit type syntax element indicating a NAL unit type of the particular NAL unit, the first syntax element having a value equal to 21, wherein NAL units having NAL unit type syntax elements with values equal to 21 belong to a particular NAL unit type, wherein coded slices of texture view components of the video data and depth view components of the video data are encapsulated within NAL units that belong to the particular NAL unit type; and
determine, based at least in part on the second syntax element, which of the following a NAL unit header of the particular NAL unit includes: an Advanced Video Coding (AVC)-compatible 3DV header extension or a Multi-View Coding (MVC)-compatible 3DV header extension:
the second syntax element being a flag,
the second syntax element having a first value indicating the NAL unit header includes the AVC-compatible 3DV header extension,
the second syntax element having a second value indicating the NAL unit header includes the MVC-compatible 3DV header extension instead of the AVC-compatible 3DV header extension,
MVC-compatible 3DV being an extension of an MVC extension of AVC,
the AVC-compatible 3DV header extension including syntax elements associated with AVC-compatible 3DV and being of a first length,
AVC-compatible 3DV being a different extension of AVC,
the MVC-compatible 3DV header extension having a different syntax structure than the AVC-compatible 3DV header extension, being of a second length different from the first length, and including syntax elements associated with MVC-compatible 3DV, and
both AVC-compatible 3DV and MVC-compatible 3DV allowing each of a plurality of views to contain both texture view components and depth view components; and
in response to determining the NAL unit includes the AVC-compatible 3DV header extension, decode the video data based at least in part on the AVC-compatible 3DV header extension.

24. The video decoding device of claim 23, wherein the AVC-compatible 3DV header extension has a syntax structure that is the same regardless of whether the particular NAL unit encapsulates a coded slice of a texture view component or a coded slice of a depth view component.

25. The video decoding device of claim 23, wherein:
the particular NAL unit does not encapsulate a coded slice of a texture view component if the particular NAL unit includes the MVC-compatible 3DV header extension,
the particular NAL unit encapsulates a coded slice of a depth view component, and
the coded slice of the depth view component has a first syntax structure if the particular NAL unit includes the AVC-compatible 3DV header extension and has a second syntax structure if the particular NAL unit includes the MVC-compatible 3DV header extension, the second syntax structure being different than the first syntax structure.

26. The video decoding device of claim 25, wherein the particular NAL unit is a first NAL unit, the particular NAL unit type is a first NAL unit type, the MVC-compatible 3DV header extension is a first MVC-compatible 3DV header extension, and the one or more processors are further configured to:
receive a second NAL unit, the second NAL unit belonging to a second NAL unit type, a NAL unit header of the second NAL unit including a second MVC-compatible 3DV header extension, the second MVC-compatible 3DV header extension having the same syntax structure as the first MVC-compatible 3DV header extension, the second NAL unit encapsulating a coded slice of a texture view component.

37

27. The video decoding device of claim 23, wherein the one or more processors are configured to:
in response to determining that the second syntax element indicates that the NAL unit header of the particular NAL unit includes the MVC-compatible 3DV header extension, reconstruct at least a portion of the video data based at least in part on the MVC-compatible 3DV header extension.

28. The video decoding device of claim 23, wherein the second syntax element immediately precedes the AVC-compatible 3DV header extension or the MVC-compatible 3DV header extension.

29. The video decoding device of claim 23, wherein the particular NAL unit includes a coded representation of a slice of a texture view component and a third syntax element, the third syntax element indicating a view index of the texture view component, wherein if the video data is encoded for a first decoder profile, the third syntax element contains a smaller number of bits in the NAL unit header of the particular NAL unit than if the video data is encoded for a second decoder profile.

30. The video decoding device of claim 23, wherein the video decoding device is a mobile computing device.

31. A video encoding device that encodes video data, the video encoding device comprising:
means for receiving the video data, the video data comprising pictures;
means for generating a bitstream that comprises generating a series of Network Abstraction Layer (NAL) units, the series of NAL units including a plurality of coded slice NAL units that contain coded slices of the pictures of the video data, wherein the means for generating the bitstream comprises:
means for generating a first syntax element in a particular NAL unit in the series of NAL units, the first syntax element being a NAL unit type syntax element indicating a NAL unit type of the particular NAL unit, the first syntax element having a value equal to 21, wherein NAL units having NAL unit type syntax elements with values equal to 21 belong to a particular NAL unit type, wherein encoded slices of texture view components of the video data and depth view components of the video data are encapsulated within NAL units that belong to the particular NAL unit type;
means for generating a second syntax element in the particular NAL unit in addition to the first syntax element, the second syntax element being a flag, the second syntax element having a first value indicating a NAL unit header of the particular NAL unit includes an Advanced Video Coding (AVC)-compatible three-dimensional video (3DV) header extension, the second syntax element having a second, different value indicating the NAL unit header of the particular NAL unit includes a Multi-View Coding (MVC)-compatible 3DV header extension instead of the AVC-compatible 3DV header extension, MVC-compatible 3DV being an extension of an MVC extension of AVC,
the AVC-compatible 3DV header extension including syntax elements associated with AVC-compatible 3DV and being of a first length, AVC-compatible 3DV being a different extension of AVC, and
the MVC-compatible 3DV header extension having a different syntax structure from the AVC-compatible 3DV header extension, being of a second length different from the first length, and including syntax elements associated with MVC-compatible 3DV, both AVC-compatible 3DV and MVC-compatible 3DV allowing each of a plurality of views to contain both texture view components and depth view components; and
means for outputting the bitstream.

32. A video decoding device that decodes video data, the video decoding device comprising:
means for receiving a bitstream that comprises a series of network abstraction layer (NAL) units, the series of NAL units including a plurality of coded slice NAL units that contain coded slices of pictures of the video data, wherein the means for receiving the bitstream comprises means for receiving a particular NAL unit in the series of the NAL units that includes at least a first syntax element and additionally includes a second syntax element, the first syntax element being a NAL unit type syntax element indicating a NAL unit type of the particular NAL unit, the first syntax element having a value equal to 21, wherein NAL units having NAL unit type syntax elements with values equal to 21 belong to a particular NAL unit type, wherein coded slices of texture view components of the video data and depth view components of the video data are encapsulated within NAL units that belong to the particular NAL unit type; and
means for determining, based at least in part on the second syntax element, which of the following a NAL unit header of the particular NAL unit includes: an Advanced Video Coding (AVC)-compatible 3DV header extension or a Multi-View Coding (MVC)-compatible 3DV header extension:
the second syntax element being a flag,
the second syntax element having a first value indicating the NAL unit header includes the AVC-compatible 3DV header extension,
the second syntax element having a second value indicating the NAL unit header includes the MVC-compatible 3DV header extension instead of the AVC-compatible 3DV header extension,
MVC-compatible 3DV being an extension of an MVC extension of AVC,
the AVC-compatible 3DV header extension including syntax elements associated with AVC-compatible 3DV and being of a first length,
AVC-compatible 3DV being a different extension of AVC,
the MVC-compatible 3DV header extension having a different syntax structure from the AVC-compatible 3DV header extension, being of a second length different from the first length, and including syntax elements associated with MVC-compatible 3DV, and
both AVC-compatible 3DV and MVC-compatible 3DV allowing each of a plurality of views to contain both texture view components and depth view components; and
means for decoding, responsive to determining the NAL unit includes the AVC-compatible 3DV header extension, the video data based at least in part on the AVC-compatible 3DV header extension.

33. A non-transitory computer-readable storage medium that stores instructions that, when executed by one or more processors of a video encoding device, configure the video encoding device to:

receive video data that comprises pictures;
generate a bitstream that comprises a series of Network Abstraction Layer (NAL) units, the series of NAL units including a plurality of coded slice NAL units that contain coded slices of the pictures of the video data, wherein as part of configuring the video encoding device to generate the bitstream, the instructions, when executed, configure the video encoding device to:
generate a first syntax element in a particular NAL unit in the series of NAL units, the first syntax element being a NAL unit type syntax element indicating a NAL unit type of the particular NAL unit, the first syntax element having a value equal to 21, wherein NAL units having NAL unit type syntax elements with values equal to 21 belong to a particular NAL unit type, wherein coded slices of texture view components of the video data and depth view components of the video data are encapsulated within NAL units that belong to the particular NAL unit type;
generate a second syntax element in the particular NAL unit in addition to the first syntax element, the second syntax element being a flag, the second syntax element having a first value indicating a NAL unit header of the particular NAL unit includes an Advanced Video Coding (AVC)-compatible three-dimensional video (3DV) header extension, the second syntax element having a second, different value indicating the NAL unit header of the particular NAL unit includes a Multi-View Coding (MVC)-compatible 3DV header extension instead of the AVC-compatible 3DV header extension, MVC-compatible 3DV being an extension of an MVC extension of AVC,
the AVC-compatible 3DV header extension including syntax elements associated with AVC-compatible 3DV and being of a first length, AVC-compatible 3DV being a different extension of AVC, and
the MVC-compatible 3DV header extension having a different syntax structure from the AVC-compatible 3DV header extension, being of a second length different from the first length, and including syntax elements associated with MVC-compatible 3DV, both AVC-compatible 3DV and MVC-compatible 3DV allowing each of a plurality of views to contain both texture view components and depth view components; and
output the bitstream.

34. A non-transitory computer-readable storage medium that stores instructions that, when executed by one or more processors of a video decoding device, configure the video decoding device to:
receive a bitstream that comprises a series of network abstraction layer (NAL) units, the series of NAL units including a plurality of coded slice NAL units that contain coded slices of pictures of video data, wherein as part of configuring the video decoding device to receive the bitstream, the instructions, when executed, configure the video decoding device to receive a particular NAL unit in the series of NAL units that includes at least a first syntax element and additionally includes a second syntax element, the first syntax element being a NAL unit type syntax element indicating a NAL unit type of the particular NAL unit, the first syntax element having a value equal to 21, wherein NAL units having NAL unit type syntax elements with values equal to 21 belong to a particular NAL unit type, wherein coded slices of texture view components of the video data and depth view components of the video data are encapsulated within NAL units that belong to the particular NAL unit type; and
determine, based at least in part on the second syntax element, which of the following a NAL unit header of the particular NAL unit includes: an Advanced Video Coding (AVC)-compatible 3DV header extension or a Multi-View Coding (MVC)-compatible 3DV header extension:
the second syntax element being a flag,
the second syntax element having a first value indicating the NAL unit header includes the AVC-compatible 3DV header extension,
the second syntax element having a second value indicating the NAL unit header includes the MVC-compatible 3DV header extension instead of the AVC-compatible 3DV header extension,
MVC-compatible 3DV being an extension of an MVC extension of AVC,
the AVC-compatible 3DV header extension including syntax elements associated with AVC-compatible 3DV and being of a first length,
AVC-compatible 3DV being a different extension of AVC,
the MVC-compatible 3DV header extension having a different syntax structure from the AVC-compatible 3DV header extension, being of a second length different from the first length, and includes syntax elements associated with MVC-compatible 3DV, and
both AVC-compatible 3DV and MVC-compatible 3DV allowing each of a plurality of views to contain both texture view components and depth view components; and
responsive to determining the NAL unit includes the AVC-compatible 3DV header extension, decode the video data based at least in part on the AVC-compatible 3DV header extension.

35. The video decoding device of claim 23, wherein the video decoding device comprises at least one of:
an integrated circuit;
a microprocessor; or
a wireless handset.

36. The video decoding device of claim 23, further comprising a display configured to display the decoded video data.

37. The video encoding device of claim 16, wherein the video encoding device comprises at least one of:
an integrated circuit;
a microprocessor; or
a wireless handset.

38. The video encoding device of claim 16, further comprising a camera configured to capture the video data.

* * * * *